(12) United States Patent
Delgado et al.

(10) Patent No.: US 7,753,098 B2
(45) Date of Patent: Jul. 13, 2010

(54) SPRING LOADED TOOLING HEAD AND METHOD FOR TIRE CORD APPLICATION

(75) Inventors: Andres Ignacio Delgado, Medina, OH (US); Jean-Claude Girard, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1185 days.

(21) Appl. No.: 11/291,290

(22) Filed: Dec. 1, 2005

(65) Prior Publication Data

US 2007/0125479 A1 Jun. 7, 2007

(51) Int. Cl.
*B29D 30/16* (2006.01)
*B29C 70/38* (2006.01)

(52) U.S. Cl. .............. 156/397; 156/117; 156/425; 156/510

(58) Field of Classification Search .......... 156/117, 156/397, 425, 408–413
See application file for complete search history.

(56) References Cited

U.S. PATENT DOCUMENTS

| | | | |
|---|---|---|---|
| 2,966,933 A | 1/1961 | Boussu et al. | 152/362 |
| 3,002,874 A | 10/1961 | Lowe | 156/397 |
| 3,082,140 A | 3/1963 | Vanzo | 156/175 |
| 3,251,722 A * | 5/1966 | Holman | 156/130 |
| 3,422,874 A | 1/1969 | Weitzel | 152/361 |
| 3,774,662 A | 11/1973 | Neville et al. | 156/148 |
| 3,802,982 A | 4/1974 | Alderfer | 156/148 |
| 3,815,652 A | 6/1974 | Pouilloux | 152/356 |
| 3,935,894 A | 2/1976 | Pouilloux | 152/356 |
| 3,939,671 A | 2/1976 | Lawson et al. | 66/86 |
| 3,998,986 A | 12/1976 | Williams | 428/102 |
| 4,790,898 A | 12/1988 | Woods | 156/166 |
| 4,830,781 A | 5/1989 | Oswald | 152/530 |
| 4,954,204 A * | 9/1990 | Grimshaw | 156/361 |
| 5,002,621 A | 3/1991 | Ikeda | 156/177 |
| 5,110,395 A * | 5/1992 | Vaniglia | 156/425 |
| 5,273,094 A | 12/1993 | Chavet | 152/448 |
| 6,328,836 B1 | 12/2001 | Ogawa | 156/117 |
| 6,623,582 B1 | 9/2003 | Ogawa | 156/117 |
| 6,929,047 B2 | 8/2005 | Mayet | 156/397 |

(Continued)

FOREIGN PATENT DOCUMENTS

EP 116137 8/1984

(Continued)

OTHER PUBLICATIONS

European Search Report completed Apr. 16, 2009.

*Primary Examiner*—Geoffrey L Knable
(74) *Attorney, Agent, or Firm*—Richard B. O'Planick

(57) ABSTRACT

A tooling head for bi-directional tire cord application to an annular surface reciprocates in a forward and a reverse direction across the annular surface. The tooling head includes a housing; a nose block assembly coupled to the housing and reciprocating in an axial direction relative to the tooling head housing; a pair of cord engaging rollers mounted to a remote end of the nose block assembly and moving therewith in a forward and a reverse direction across the annular surface, the rollers positioning at least one cord against the annular surface in the forward and reverse directions; and a biasing element engaging against the nose block assembly for alternatively biasing the rollers against the annular surface.

12 Claims, 28 Drawing Sheets

U.S. PATENT DOCUMENTS

| | | | |
|---|---|---|---|
| 2001/0020518 A1 | 9/2001 | Mayet | 156/397 |
| 2002/0046796 A1* | 4/2002 | Hitotsuyanagi et al. | 156/117 |
| 2002/0117265 A1 | 8/2002 | Mayet | 156/400 |
| 2005/0028915 A1 | 2/2005 | Panning | 152/548 |
| 2005/0067081 A1 | 3/2005 | Nakakura et al. | |

FOREIGN PATENT DOCUMENTS

| | | |
|---|---|---|
| EP | 0 467 560 A2 | 1/1992 |
| EP | 0 524 703 A3 | 1/1993 |
| EP | 0 557 615 A1 | 9/1993 |
| EP | 897 813 A2 | 2/1999 |
| EP | 0 916 522 A2 | 5/1999 |
| EP | 1 101 597 A2 | 5/2001 |
| EP | 1447209 A2 | 8/2004 |
| EP | 1537986 A1 | 6/2005 |
| GB | 1 203 198 | 8/1970 |
| GB | 2 212 441 A | 7/1989 |
| JP | 11-170394 | 6/1999 |
| JP | 11-198247 | 7/1999 |
| JP | 2000-52448 | 2/2000 |
| JP | 2001 233016 A | 8/2001 |
| WO | WO 02/083434 A1 | 10/2002 |
| WO | WO03055667 | 7/2003 |

* cited by examiner

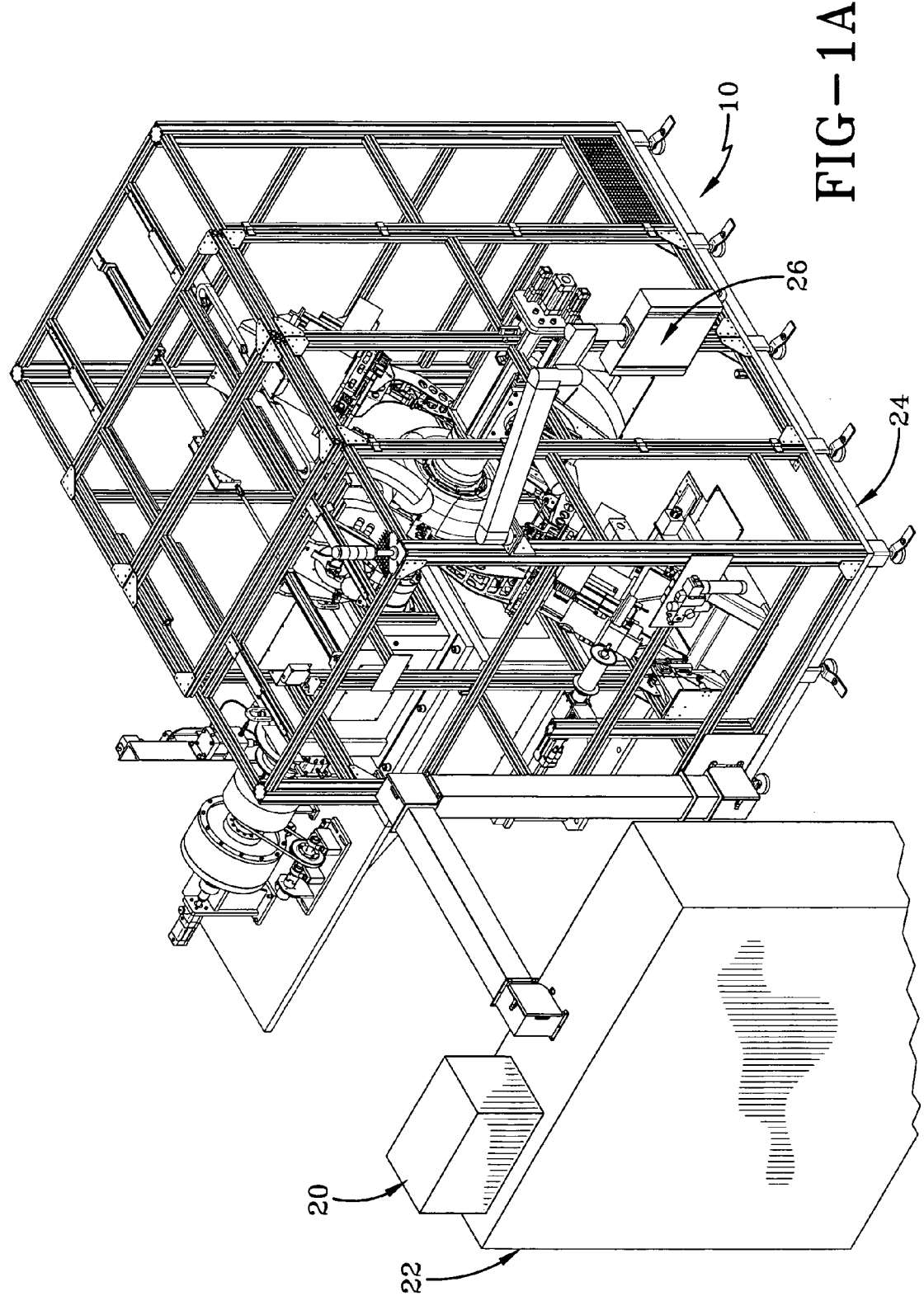

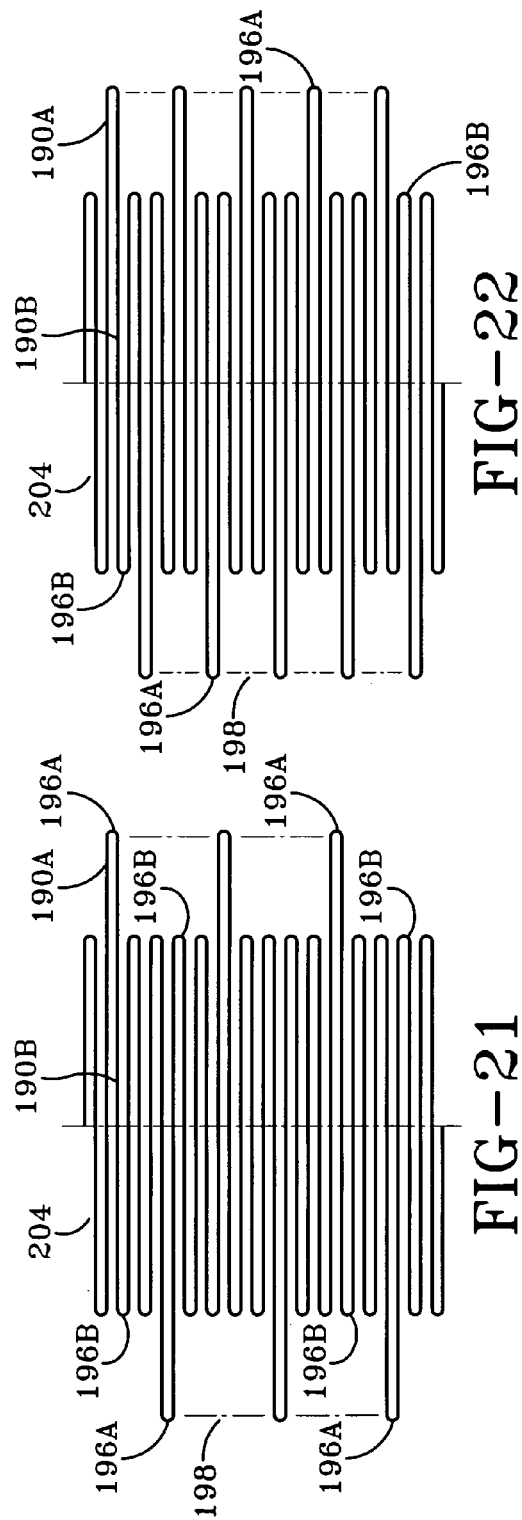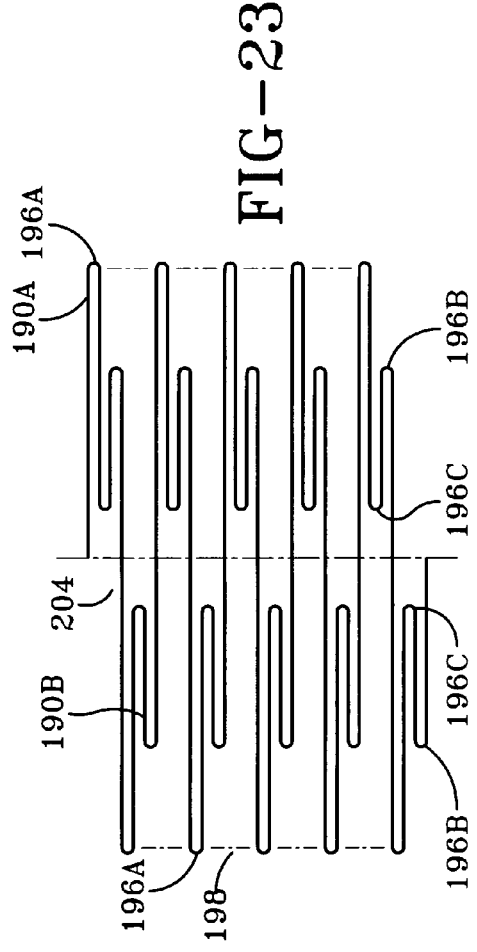

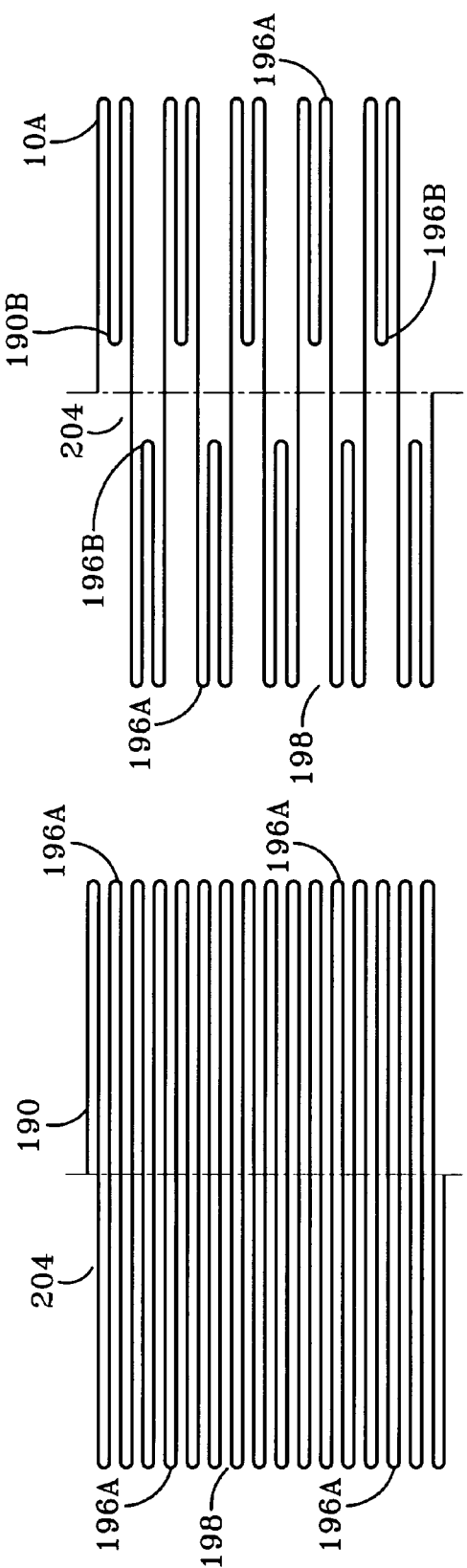
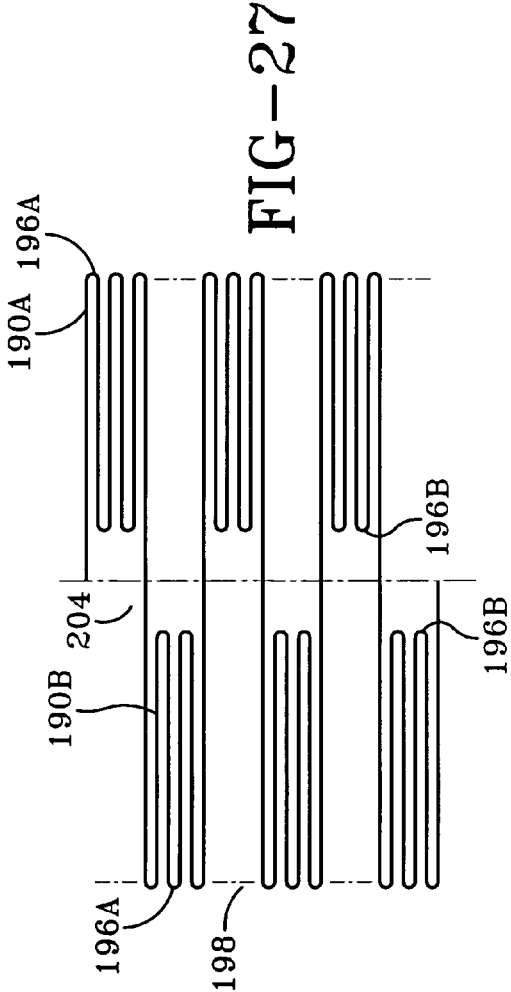
FIG-25
FIG-26
FIG-27

SPRING LOADED TOOLING HEAD AND METHOD FOR TIRE CORD APPLICATION

FIELD OF THE INVENTION

This invention relates generally to an improved apparatus for manufacturing a toroidal carcass ply for a tire and, more specifically, to an applicator head for direct application of a single end cord to an annular tire building surface.

BACKGROUND OF THE INVENTION

Historically, the pneumatic tire has been fabricated as a laminate structure of generally toroidal shape having beads, a tread, belt reinforcement, and a carcass. The tire is made of rubber, fabric, and steel. The manufacturing technologies employed for the most part involved assembling the many tire components from flat strips or sheets of material. Each component is placed on a building drum and cut to length such that the ends of the component meet or overlap creating a splice.

In the first stage of assembly the prior art carcass will normally include one or more plies, and a pair of sidewalls, a pair of apexes, an innerliner (for a tubeless tire), a pair of chafers and perhaps a pair of gum shoulder strips. Annular bead cores can be added during this first stage of tire building and the plies can be turned around the bead cores to form the ply turnups. Additional components may be used or even replace some of those mentioned above.

This intermediate article of manufacture would be cylindrically formed at this point in the first stage of assembly. The cylindrical carcass is then expanded into a toroidal shape after completion of the first stage of tire building. Reinforcing belts and the tread are added to this intermediate article during a second stage of tire manufacture, which can occur using the same building drum or work station.

This form of manufacturing a tire from flat components that are then formed toroidally limits the ability of the tire to be produced in a most uniform fashion. As a result, an improved method and apparatus has been proposed, the method involving applying an elastomeric layer on a toroidal surface and placing and stitching one or more cords in continuous lengths onto the elastomeric layer in predetermined cord paths. The method further includes dispensing the one or more cords from spools and guiding the cord in a predetermined path as the cord is being dispensed. Preferably, each cord, pre-coated with rubber or not so coated, is held against the elastomeric layer after the cord is placed and stitched and then indexing the cord path to a next circumferential location forming a loop end by reversing the direction of the cord and releasing the held cord after the loop end is formed and the cord path direction is reversed. Preferably, the indexing of the toroidal surface establishes the cord pitch uniformly in discrete angular spacing at specific diameters.

The above method is performed using an apparatus for forming an annular toroidally shaped cord reinforced ply which has a toroidal mandrel, a cord dispenser, a device to guide the dispensed cords along predetermined paths, a device to place an elastomeric layer on the toroidal mandrel, a device to stitch the cords onto the elastomeric layer, and a device to hold the cords while loop ends are formed. The device to stitch the cords onto the elastomeric layer includes a bi-directional tooling head mounted to a tooling arm. A pair of roller members is mounted side by side at a remote end of the tooling head and defining a cord exiting opening therebetween. The arm moves the head across the curvature of a tire carcass built on a drum or core while the cord is fed through the exit opening between the rollers. The rollers stitch the cord against the annular surface as the cord is laid back and forth across the surface, the first roller engaging the cord along a first directional path and the second roller engaging the cord in a reversed opposite second directional path.

The toroidal mandrel is preferably rotatable about its axis and a means for rotating is provided which permits the mandrel to index circumferentially as the cord is placed in a predetermined cord path. The guide device preferably includes a multi axis robotic computer controlled system and a ply mechanism to permit the cord path to follow the contour of the mandrel including the concave and convex profiles.

While working well, certain challenges exist in the aforementioned proposed apparatus and method. For example, it would be desirable for the tooling head to maintain a constant optimal pressure against the annular surface. Excessive pressure can damage the cord or the underlying layer, resulting in a less than satisfactory cord layer in the finished tire. Excessive pressure can also break the cord, requiring a re-application of the cord layer and consequently detrimentally increasing manufacturing times. On the other hand, too little pressure on the cord may result in a less than optimal adherence of the cord to the underlying layer. Less than a proper level of adherence between the cord and the underlying layer may allow the cord to shift out of position during or after the cord laying procedure, resulting again in a cord layer that is defective in the finished tire.

Existing tooling heads, however, have proven less than adequate in maintaining constant optimal pressure against the annular core surface. Imperfections in the previously applied layers and the fixed spatial disposition of the rollers relative to the core surface result in a variable contact pressure exerted by the rollers against the annular surface. The consequence is a less controlled application of the cord against the annular surface.

A further drawback in proposed bi-directional tooling heads for laying a single end cord against an annular core surface is that such tooling heads are undesirably complicated and expensive to build and maintain. Such heads incorporate mechanical fingers and paddles to loop and pressure the cord into the ply compound as the head traverses the core surface. Controlling the pressure that such mechanisms exert upon the cord and annular surface, however, has proven problematic in view of the complexity of the mechanism itself and surface anomalies in the previously applied layer(s).

A need, accordingly, remains for an applicator head that is simple to construct, operationally reliable and efficient, and effective in bi-directional application of a single end cord to a tire carcass. Furthermore, a need exists for an applicator head that can effectively apply a tire cord at a constant optimal pressure against an annular core surface in order to adjust for surface layer(s) anomalies and thickness.

SUMMARY OF THE INVENTION

Pursuant to one aspect of the invention, a tooling head for bi-directional tire cord application to an annular surface has a nose block assembly slideably connected to a tooling head assembly. The nose block assembly moves reciprocally in an axial direction relative to the tooling head housing and includes a cord-engaging element. A cord engaging element moves with the nose block assembly in a forward and a reverse direction across the annular surface and is positioned to engage at least one cord against the annular surface in the forward and reverse directions. In accordance with the invention, a biasing element is provided to engage against the nose block assembly and bias the cord engaging element against the annular surface in the forward and reverse directions.

Pursuant to another aspect of the invention, the cord engaging element is represented by a plurality of rollers, at least one roller of the plurality of rollers engaging against the annular surface in the forward direction and disengaging from the annular surface in the reverse direction. Another aspect includes a tilting mechanism that tilts the nose block assembly between first and second angular positions while the cord engaging element moves respectively in the forward and reverse directions across the annular surface.

Pursuant to yet a further aspect of the invention, the tooling head assembly includes a chamber and the biasing element comprises a pneumatic intake in communication with the tooling head assembly chamber for directing pressurized air against the nose block assembly. The nose block assembly may thus maintain contact with the annular core surface at substantially a constant optimal pressure until the cord layer is completed by the tooling head traversing the annular surface in the forward and reverse directions.

According to another aspect of the invention, a method for bi-directional tire cord application to an annular surface is employed, comprising: mounting a tooling head for reciprocal movement in a forward and a reverse direction across the annular surface, the tooling head having a plurality of annular surface engaging roller components at a terminal end at the annular surface; feeding a length of tire cord through the tooling head to the terminal end of the tooling head; selectively routing the tire cord between at least one roller component and the annular surface as the tooling head moves across the annular surface; and biasing the at least one roller component against the annular surface as the tooling head moves across the annular surface. A method may further employed using a pneumatic spring for biasing the roller component against the annular surface at a substantially constant pressure as the tooling head moves across the annular surface.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which:

FIG. 1A is a perspective view similar to FIG. 1 showing the tire making station enclosed within a protective cage.

FIGS. 19-28 are representative ply cord patterns that may be applied to an annular core surface pursuant to the invention.

DETAILED DESCRIPTION OF THE ILLUSTRATIVE EMBODIMENTS

Figure 1:
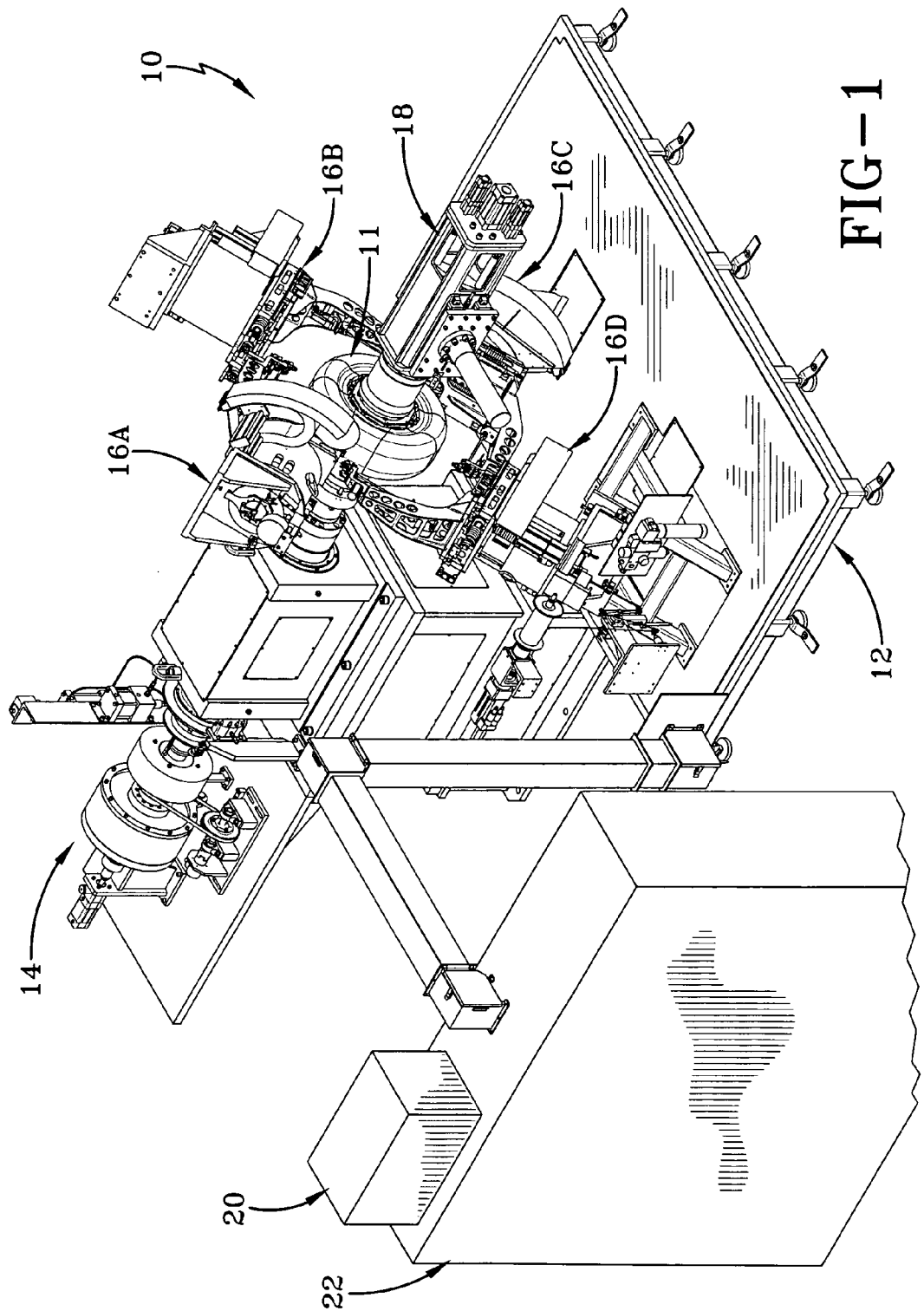
FIG. 1 is a perspective view of a tire making station employing a plurality of ply laying assemblies, each configured pursuant to an aspect of the invention.
Figure 2:
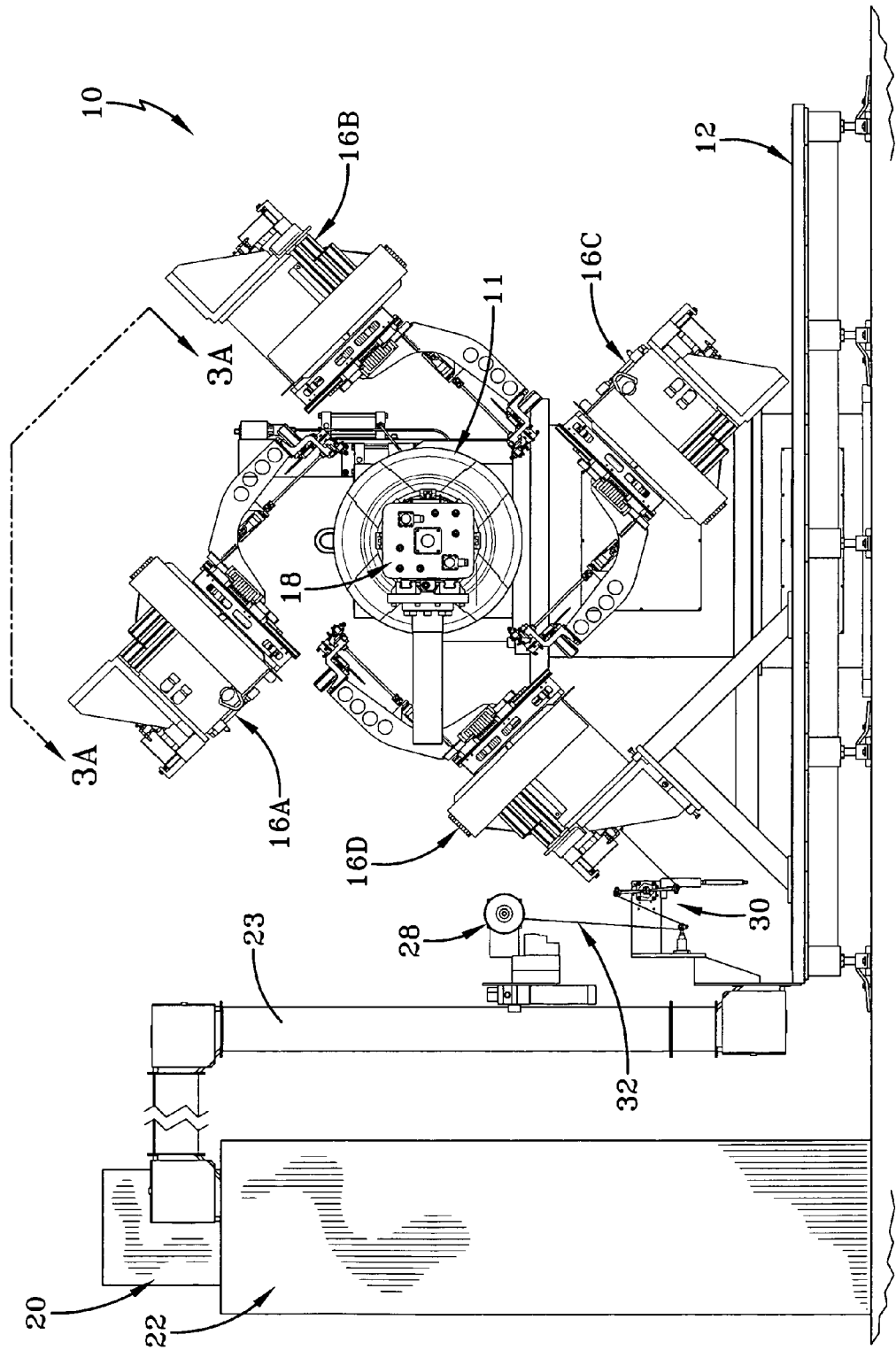
FIG. 2 is a side elevation view of the tire making station showing spatial dispensation of plural ply laying assemblies about a tire build core.

Referring initially to FIGS. 1, 1A, and 2, a machine assembly 10 is shown for the construction of a tire on a core assembly 11. The core assembly 11 is generally of toroidal shape and a tire is formed thereon by the sequential layering of tire components on the toroidal form of the core. A platform 12 may be deployed as support for the assembly 10. A drive motor 14 is coupled by a conventional shaft to rotate the core assembly 11 as tire component layers are sequentially applied to the toroidal core.

The referenced drawings depict four arm assemblies 16 A-D surrounding the core assembly in a preferred arrangement. While four assemblies are incorporated in the system embodiment 10, the invention is not to be so limited. A single arm assembly may be used if desired. Alternatively, more or fewer than four assemblies may constitute the system if desired. The four arm assemblies 16 A-D are disposed to surround the core assembly 10 at a preferred spacing that allows the arm assemblies to simultaneously construct a cord ply to respective regions of the toroidal core. Dividing the surface area of the toroidal core into four quadrants, each assigned to a respective one of the four arm assemblies, allows the cord ply layer to be formed simultaneously to all four quadrants, whereby expediting the process and saving time and manufacturing cost.

A core removal assembly 18 is shown disposed to remove the core assembly 11 from between the arm assemblies 16 A-D once tire construction on the core is complete. An appropriate computer control system conventional to the industry may be employed to control the operation of the system 10 including arm assemblies 16 A-D. A control system of the type shown will typically include a housing 22 enclosing the computer and system control hardware. Electrical control signals will be transmitted to the system 10 by means one or more suitable cable conduit such as that show at numeral 23.

A cage or peripheral guard structure 24 may enclose the system 10 as shown in FIG. 1A. An additional pendant control unit 26 for the control cooler unit 20 is mounted to the guard 24. Each of the arm assemblies 16A-D is serviced by a cord let off assembly or spool 28, only one of the four being shown in FIG. 2 for the sake of clarity. A balancer assembly 30 is associated with each let off assembly 28 for placing cord 32 fed from the assembly 28 in proper tension and balance. The cord 32 is fed as shown through the balancer assembly 20 to the arm assembly 16D.

Figure 3A:
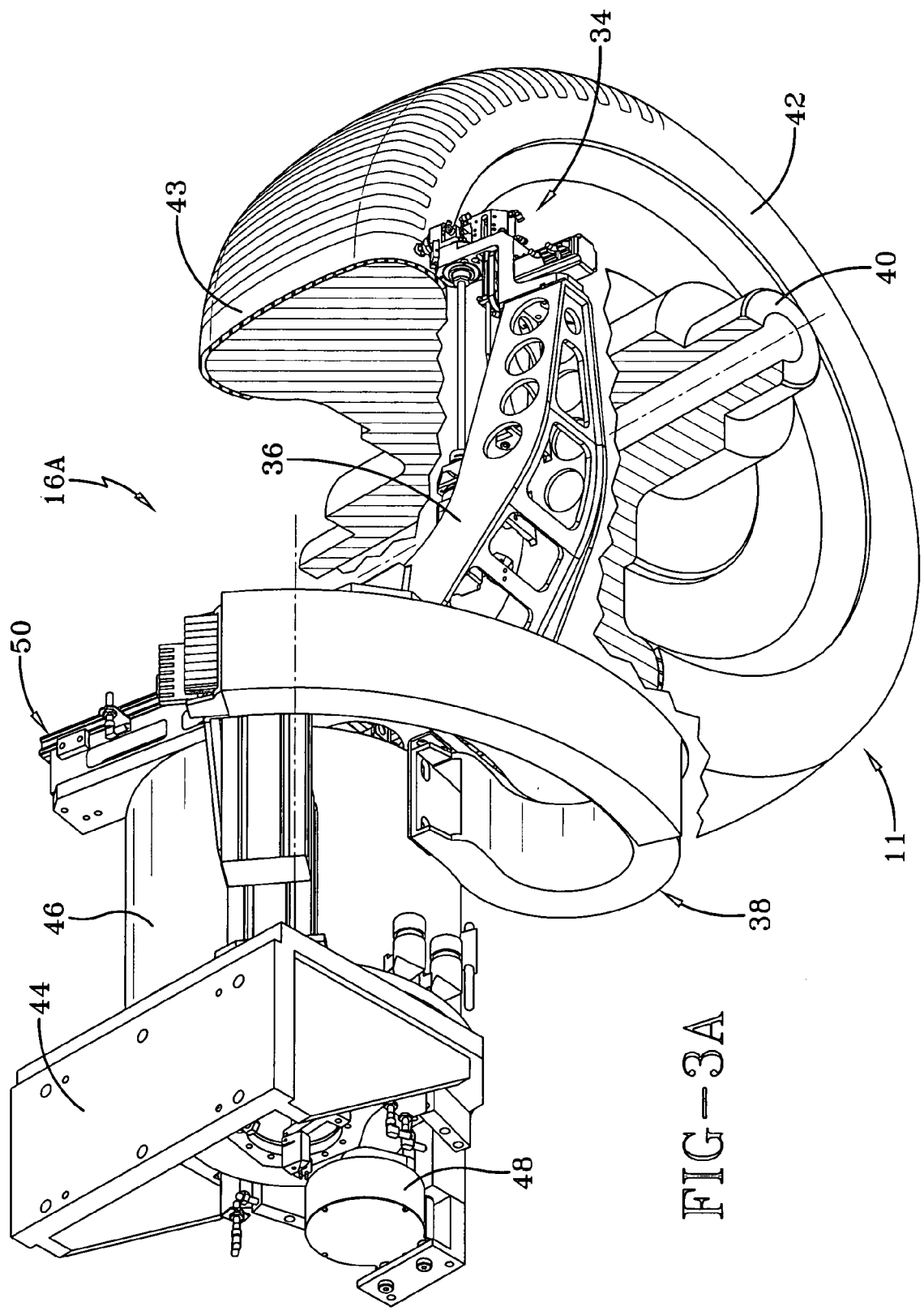
FIG. 3A is an enlarged perspective view of one ply laying assembly disposed at an initial position relative to a tire build core that is partially sectioned for illustration.
Figure 3B:
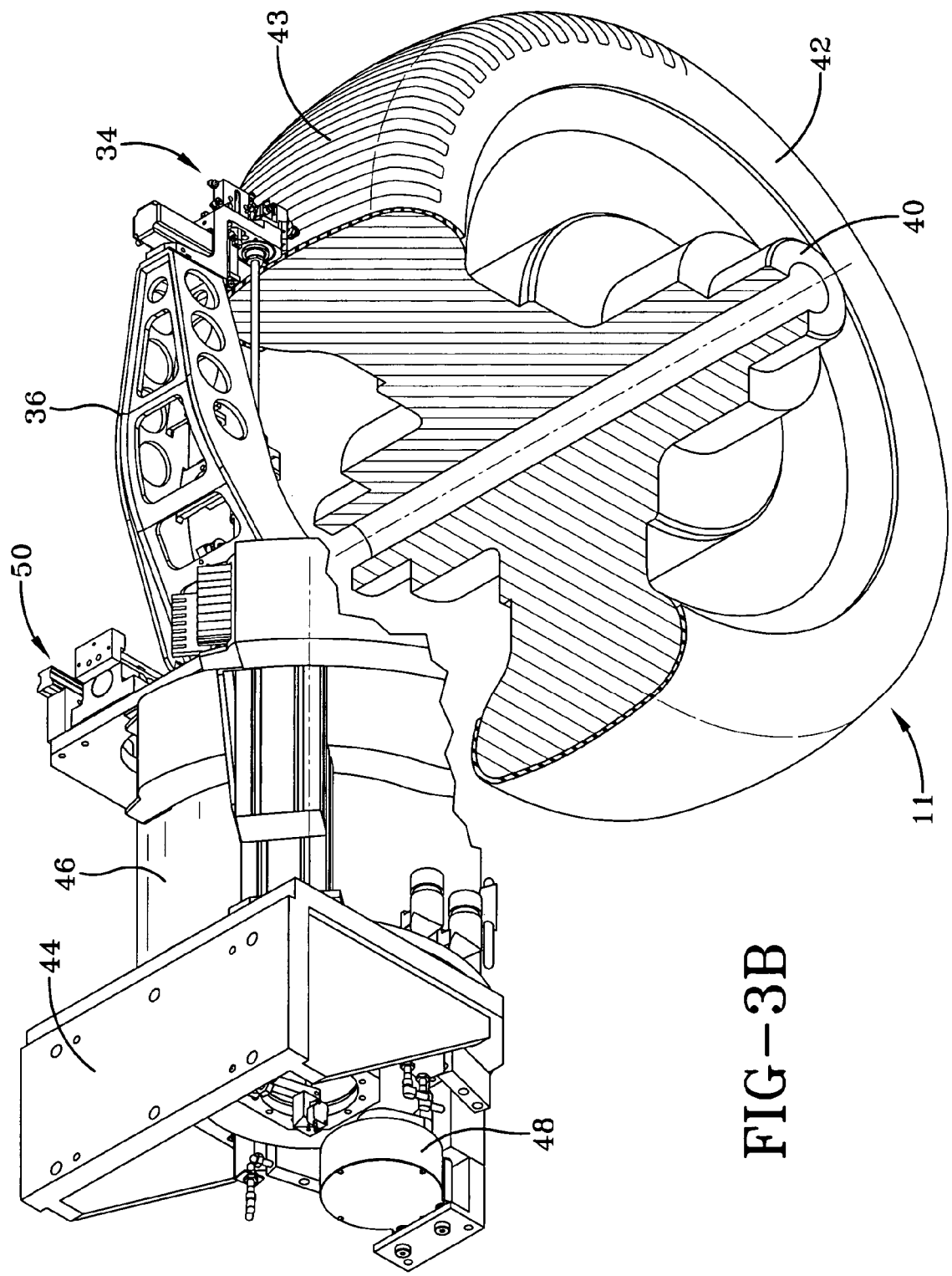
FIG. 3B is an enlarged perspective view of the ply making assembly shown in FIG. 3A at a subsequent intermediate position along a ply laying path relative to the tire build core.
Figure 6:
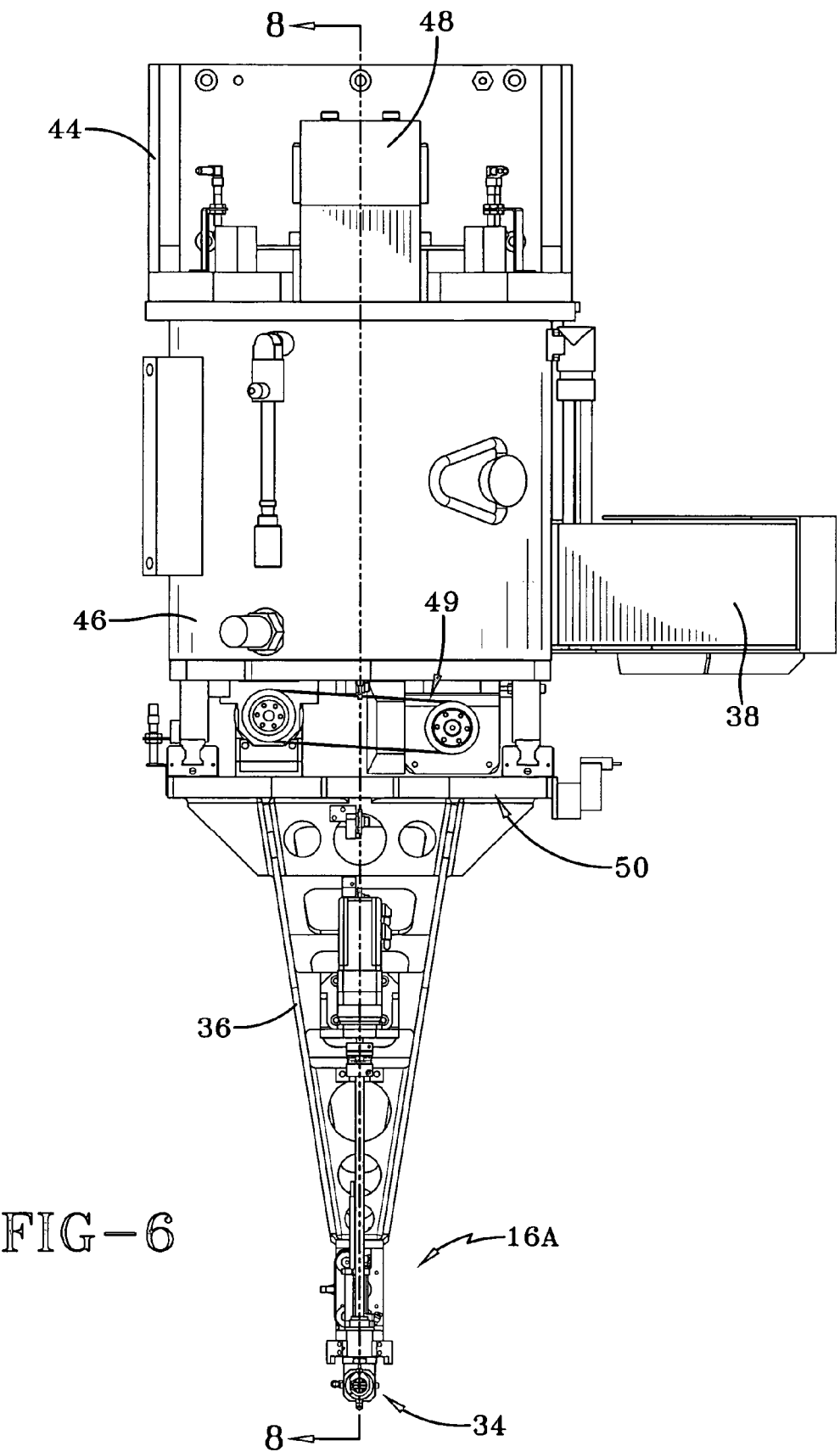
FIG. 6 is a rear elevation view of the ply laying assembly.
Figure 7:
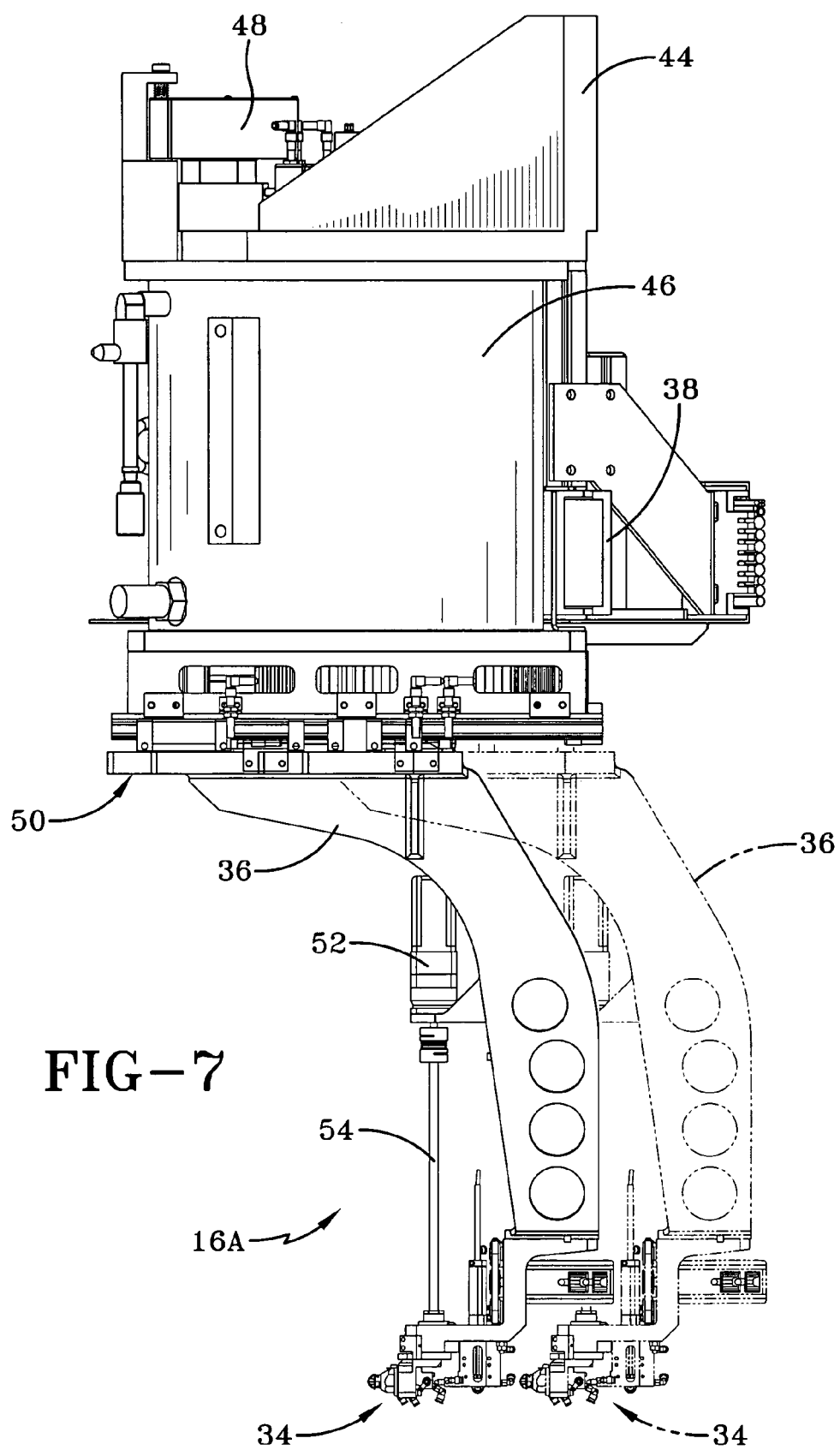
FIG. 7 is a side elevation view of the ply laying assembly showing sequential operation of the support arm slide mechanism in phantom.
Figure 8:
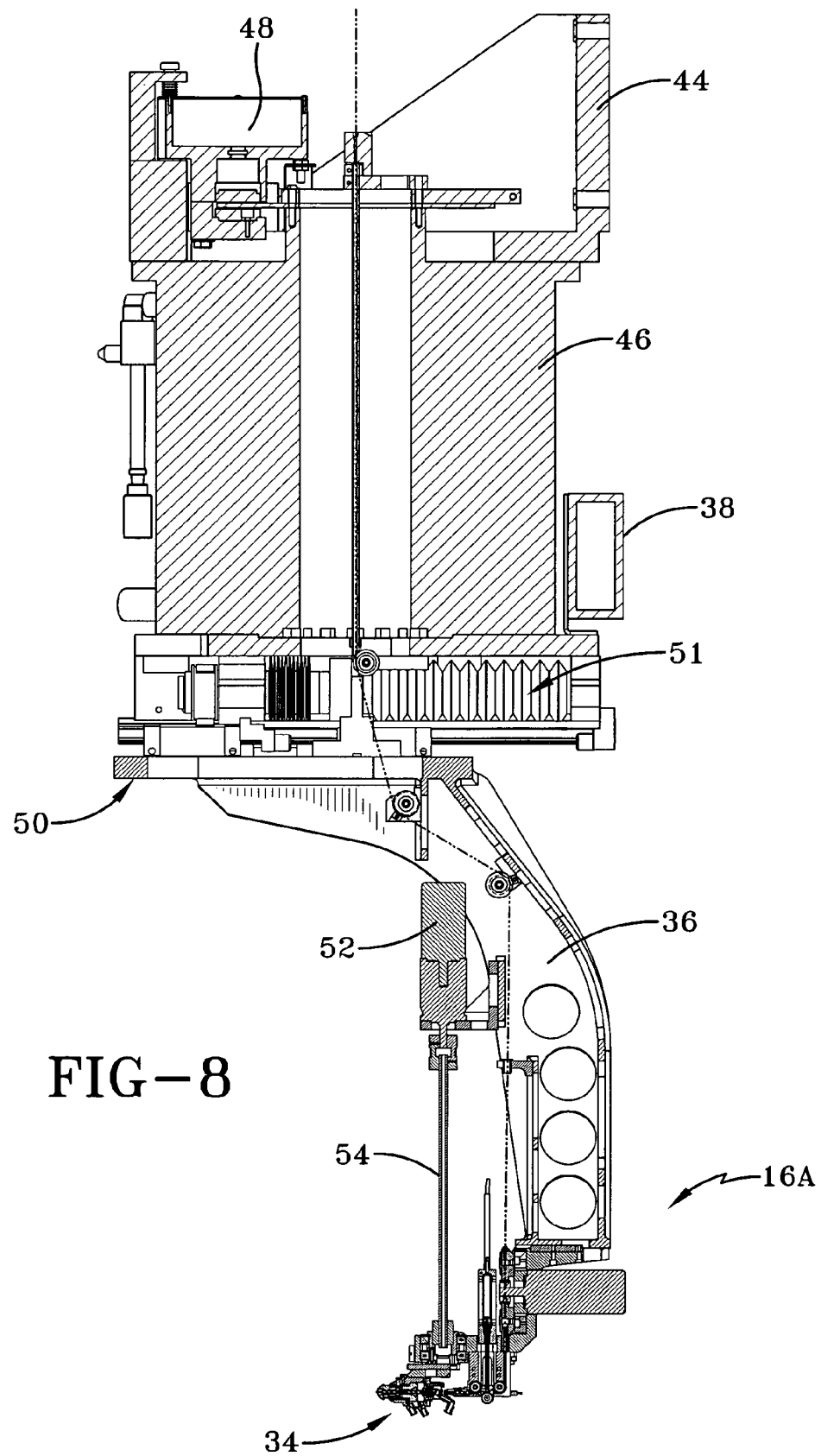
FIG. 8 is a transverse section view through the ply laying apparatus.

In FIGS. 3A-C and 4, operation of one arm assembly 16D is sequentially depicted and will be readily understood. The arm assembly 16D is configured to provide end of arm tooling assembly 34 carried by C-frame arm 36, electrically serviced by suitable cabling extending through cable tray 38. As explained previously, the core assembly 11 is configured having a rotational axial shaft 40 and a segmented toroidal core body 42 providing an annular outer toroidal surface 43. A main mounting bracket 44 supports the end of arm tooling assembly 34 as well as a drive motor 46 and clutch assembly 48. As best seen from joint consideration of FIGS. 4, 5, 6, 7, and 8, the C-frame arm 36 is slideably attached to a Z-axis vertical slide member 50 and moves along a Z-axis to traverse the width of the outer core toroidal surface 43. Movement of the arm 36 along slide member 50 facilitates the laying of cord on cores for tires of varying sizes. FIG. 3A depicts the arm assembly 36 at a beginning position relative to surface 43; FIG. 3B a position mid-way along the transverse path across surface 43; and FIG. 3C a terminal transverse position of assembly 36 at an opposite side of the surface 43. FIG. 7 illustrates the movement of arm assembly 36 along slide 50 to facilitate movement of assembly 36 between the sequential positions illustrated in FIGS. 3A-C. Drive shaft 51 is coupled to the arm assembly 36 as seen from FIG. 8 and drives the assembly along the Z-axis path in reciprocal fashion responsive to control instructions.

An end of arm tooling motor 52 is further mounted on arm assembly 36 and rotatably drives end of arm tooling shaft 54. The end of arm tooling 34 consists of a bi-directional cord laying head assembly 56, an intermediate housing assembly 57, and an upper housing assembly 59. The end of arm tooling 34 further includes a cord tensioning sub-assembly 58 as shown in detail in FIGS. 9 and 10. Sub-assembly 58 includes a drive motor 60, the motor 60 being mounted on an S-shaped block 62. The sub-assembly 58 further includes a first pulley 64; a spatially adjustable cord pulley 65; and a third pulley 66. An elongate closed-end tensioning belt 68 routes around the pulleys 64, 66 as shown. A cord guiding terminal tube 70 extends from the pulley and belt tensioning region of assembly 58 through the block 62. An initial cord guiding passageway 72 enters into the block 62 and guides cord 32 through the block and into the tensioning region of assembly 58. Belt 68 is routed around pulleys 64, 66 and is rotated thereby. It will be appreciated that the cord 32 is routed as shown between belt 68 and pulley 65 and is axially fed by the rotation of belt 68 through the assembly 58. By adjusting the relative position of pulley 65 against the cord 32 and belt 68, the cord 32 may be placed in an optimal state of tension for subsequent routing through an applicator head. The tensioning of the cord 32 is thus optimized, resulting in a positive feed through the block 62 and to an applicator head as described following. Breakage of the cord that might otherwise occur from a more or less than optimal tension level is thus avoided. Moreover, slippage of the cord caused by a lower than desired tension in the cord is likewise avoided. Additionally, the subject cord tensioning sub-assembly 58 acts to eliminate pinching of the cord that may be present in systems employing rollers to advance a cord line. Pinching of the cord from a roller feed may act to introduce a progressive twist into the cord that will release when the cord is applied to a surface, and cause the cord to move from its intended location. The assembly 58, by employing a belt cord advance, eliminates twisting of the cord and ensures that the cord will advance smoothly without impedance.

Referring next to FIGS. 11, 12, 13A, 13B, and 17, the bi-directional cord laying head assembly 56 will be described. In general, the applicator head 56 is located at a terminal end of the end of arm tooling assembly 34. The head assembly, as described below, functions to apply cord to the annular toroidal core surface 43 in a preselected pattern as one layer in the plurality of layers built upon the core 42 during construction of a tire. A pair of applicator guide rollers 74, 76 are rotatably mounted in-line to a terminal end of the end of arm tooling 34, the rollers defining a cord outlet 78 therebetween with the pivot shafts of the rollers being preferably, but not necessarily, substantially co-axial. More or fewer rollers may be employed if desired pursuant to the practice of the subject invention. The bi-directional cord laying head 56 is constructed to provide a final cord guide tube 80 extending axially to a remote end in communication with the cord outlet opening 78 between the rollers.

The intermediate assembly 57 includes a pre-loaded coil spring 82 that seats within a spring housing 84 residing within an outer housing block 85. The bi-directional cord laying head assembly 56 is placed in a downward bias against the surface 43 by the pre-loaded coil spring 82 compressed by air pressure through intake 94. O-rings 86 A-F are suitably located between adjacent housing block elements. The intermediate assembly 57 further includes a lower housing 88 receiving a housing block 89 therein. A terminal end of the block 89 is closed by an end cap 90 with the intersection sealed by means of O-rings 91. The block 89 represents a plunger, or piston, slideably contained within the outer housing 88 that moves axially relative to the end of arm tooling for a purpose explained below. The end of arm tooling 34 is pivotally mounted to the bracket 62 and reciprocally rotated by means of drive shaft 54 in the direction 69 as will be appreciated from FIG. 9.

FIGS. 11, 12, 13A, and 13B depict in section the end of arm tooling 34 including assemblies 56, 57, and 59. As shown, plural intake portals 92, 94, and 96 extend into the tooling assembly at respective axial locations; cylinder 92 representing a pressurized air inlet for assisting in the feeding of a severed cord end down the axial passageway of the end-of-arm assembly; cylinder 94 providing air pressure and forming an air spring by which the head assembly of the end of arm tooling is maintained at a constant pressure against the annular surface of the core; and cylinder 96 providing a pressurized air inlet that, upon actuation, initiates a shearing of the cord. The rollers 74, 76 mount to a nose block 97 that is slideably connected at a lower end of housing 89 by assembly pin 67. Pin 67 is keyed within a vertical slot in the housing 89 and prevents the nose block 67 from rotating. The block 67 and the rollers 74, 76 are thus maintained in an aligned orientation to the surface 43 of the core.

Figure 9:
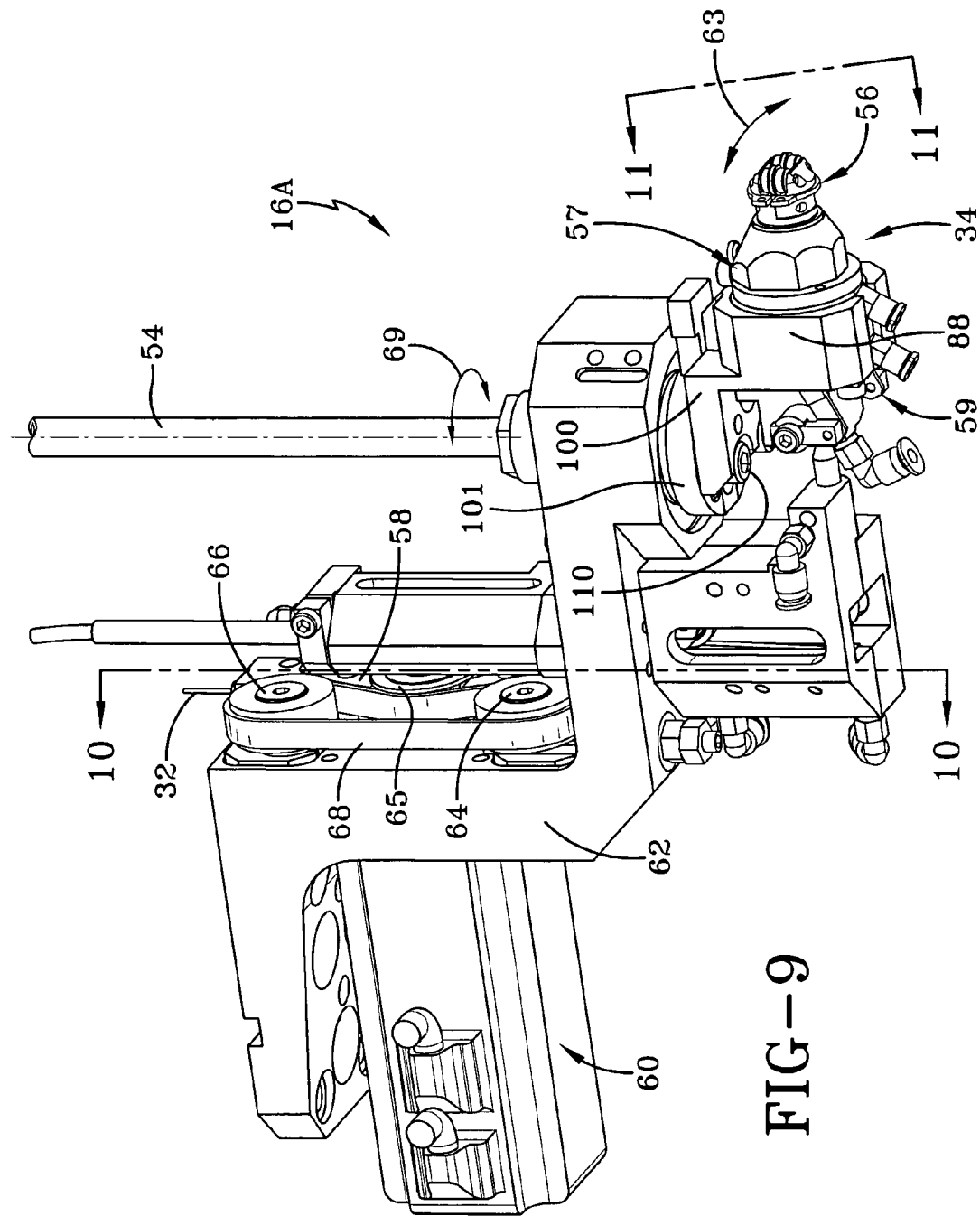
FIG. 9 is a side elevation view of the ply laying apparatus co-mounted adjacent a cord tensioning and feed assembly.

From FIG. 9, it will be appreciated that the end-of-arm tooling assembly 34 is pivotally mounted to the bracket 62 and is fixedly coupled to motor shaft 54. Shaft 54 is driven rotationally by a computer controlled servo-motor (not shown) in conventional fashion. A rotation of the shaft 54 translates into pivotal movement of assembly 34. As the assembly 34 pivots, the rollers 74, 76 tilt or pivot backward and forward, alternatively bringing the rollers into contact with the core surface 43.

Figure 12:
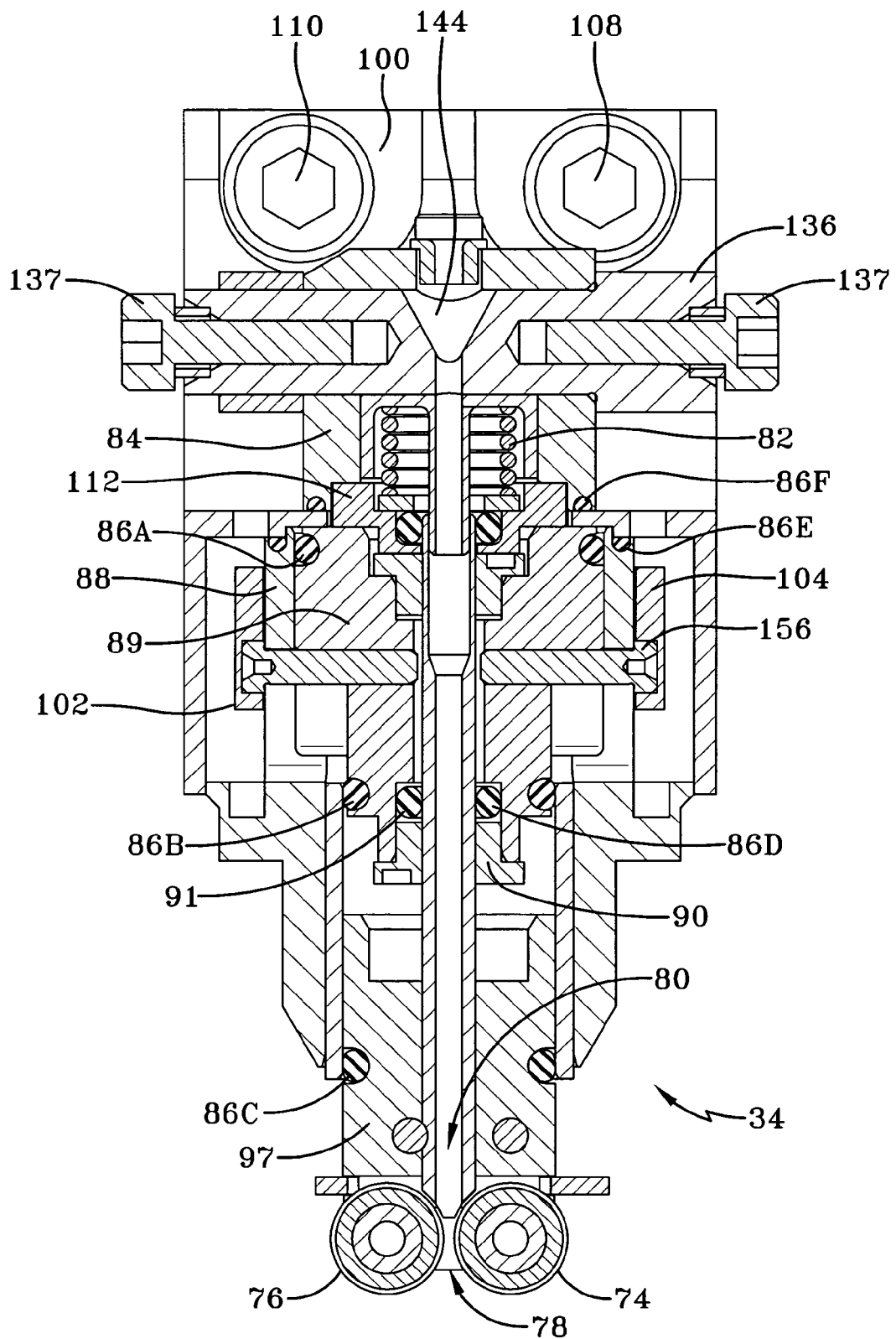
FIG. 12 is a transverse section view through the ply laying end of arm tooling.
Figure 13A:
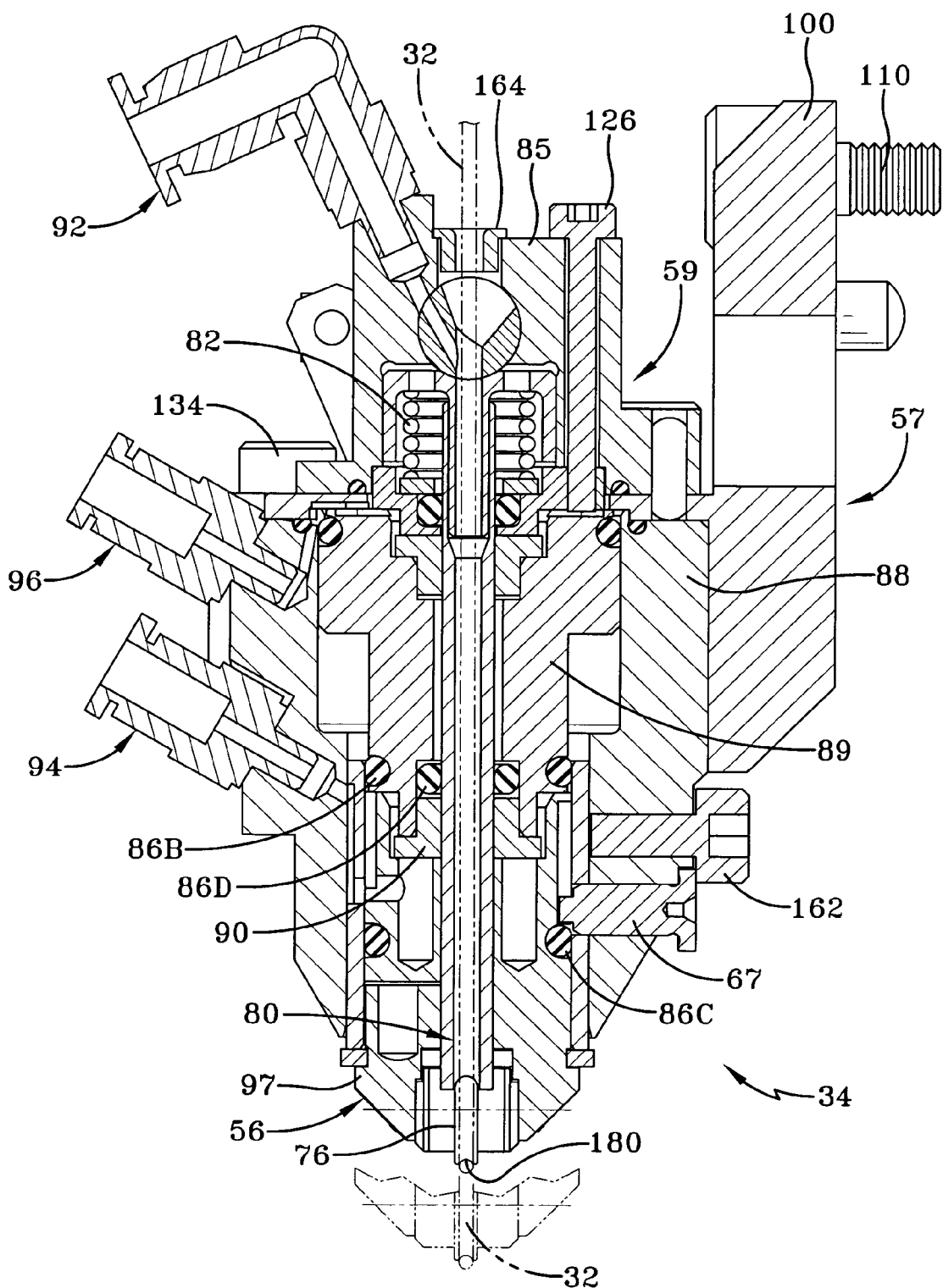
FIG. 13A is a transverse section view through the ply laying end of arm tooling shown in the retracted position and shown in phantom in the axially elongated position.
Figure 13B:
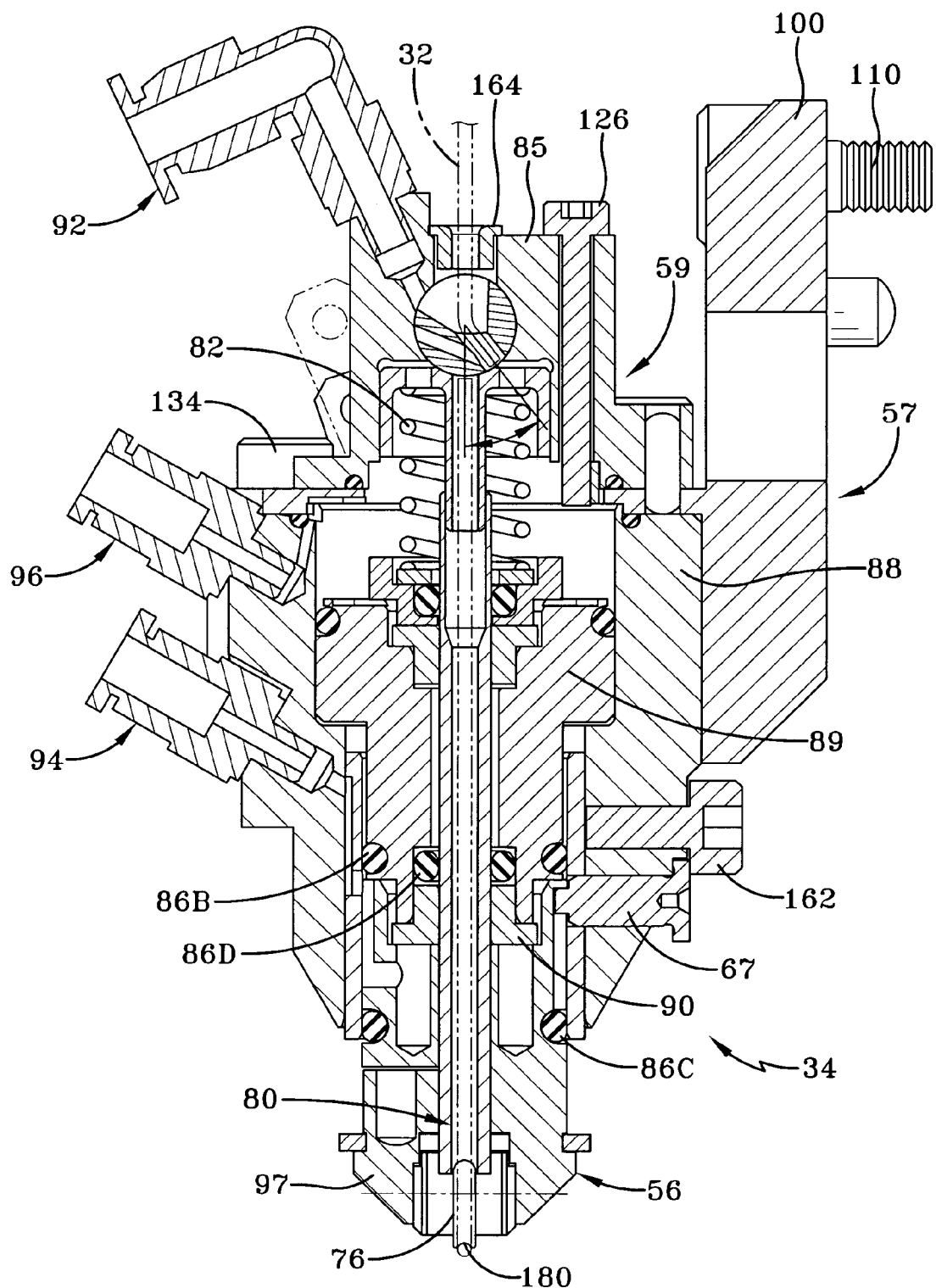
FIG. 13B is a transverse section view through the ply laying end of arm tooling of FIG. 13A shown in the axially elongated position.

It will further be appreciated from FIGS. 13A and 13B, and FIGS. 12-D, that the piston, or plunger, 89 moves axially within the assembly housing 88 in reciprocal fashion. Piston 89 moves independently of the bi-directional head 56. Thus, head 56 can remain in continuous contact with the core surface 43 at a constant, optimal pressure maintained by pressure intake 94. As head 56 and surface 43 remain in contacting engagement, the piston 89 is free to move axially within housing 88 under the influence of spring 82 between the extended position shown in FIG. 13B and FIG. 16C, and the axially retracted position shown in FIG. 13A and FIG. 16D. Spring 82 is in a compressed, pre-loaded condition with the piston 89 in the retracted axial position of FIGS. 13A and 16D, under load from pressure at intake 96. Upon removal or reduction of air pressure at intake 96, plunger block 89 moves to the extended position shown in FIGS. 13B and 16C, and spring 82 extends. A resumption of controlled air pressure at intake 96, under computer control, pressures piston 89 into the retracted position and reloads spring 82. Linear movement of the plunger block 89 is along the center axis of the end of arm tooling 34.

Figure 11:
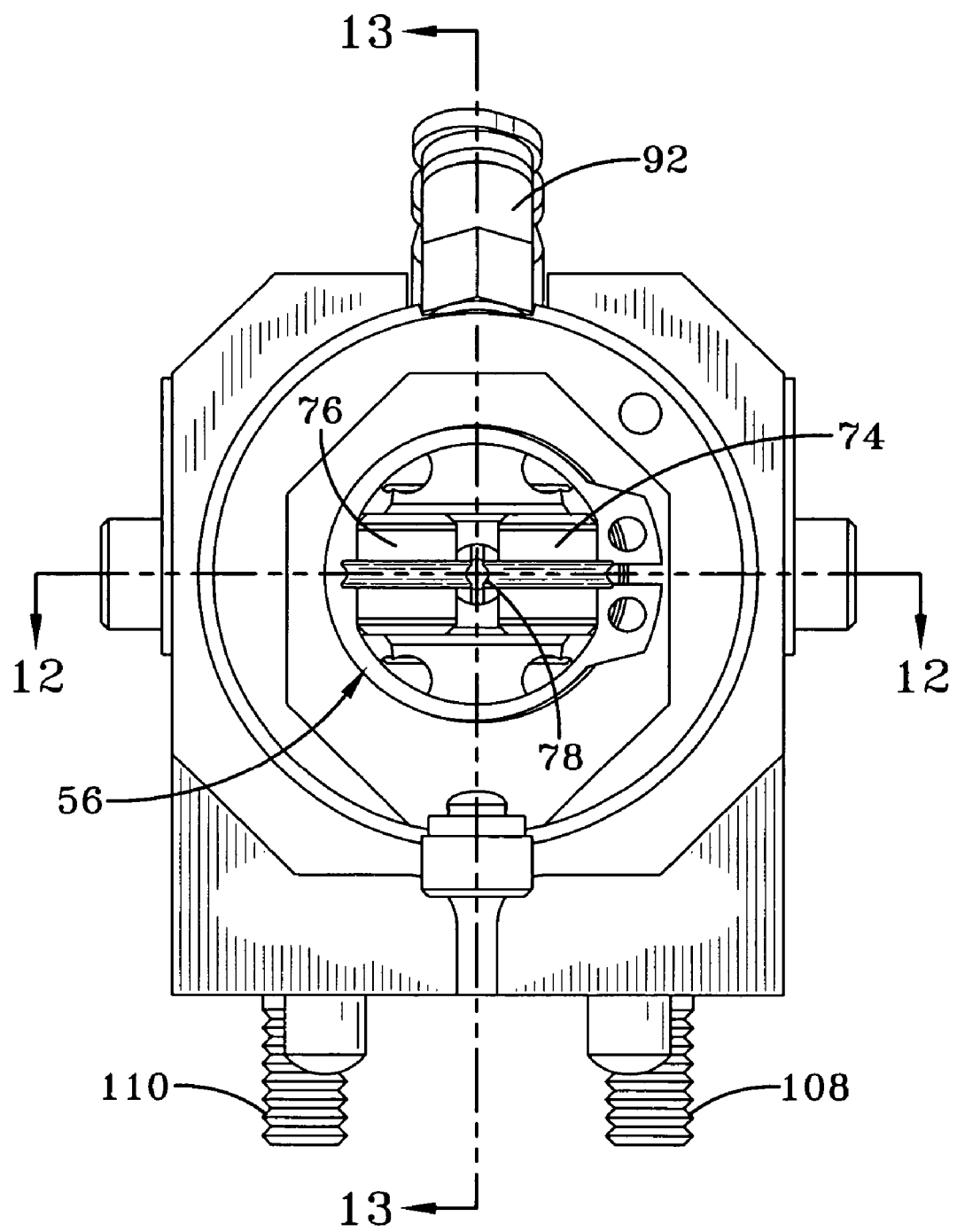
FIG. 11 is a bottom plan view of the ply laying assembly.

The final guide tube 80 extends along the center axis of the end-of-arm tooling 34 and, as will be understood from FIGS. 13A and 13B, the cord 32 is routed along the center axis of the upper assembly 59, the intermediate assembly 57, and the bi-directional cord laying head assembly 56 of the tooling 34 to exit from the cord outlet opening 78 between rollers 74, 76 (FIGS. 11, 12). The cord 32 thereby is positioned and pressured by the rollers 74, 76 against the core surface 43 in a preferred pattern. Depending upon the pattern of the cord layer to be applied to surface 43, the process of applying the court will require that the cord be cut one or more times. A preferred cutting mechanism will be described as follows.

With reference to FIGS. 15B, 16, 12, and 17, the upper assembly 59 includes a cable shear assembly 98, activated by a pair of lever arms 102, 104 that extend axially along opposite sides of the piston 89 within housing 88. The upper assembly 59 includes a mounting base flange 100 that mounts to a bearing plate 101 (FIG. 9) by means of screws 108, 110. The bearing plate 101 is rotatably mounted to the end bracket 62. As described previously, the end of arm tooling 34 may thus be rotated by motor driven shaft 54. It will be appreciated from FIG. 17 that the spring 82 seats within spring housing 84 enclosed by spring end cap 112. A forward end of spring 82 seats within the end cap 112. End cap 112 includes a circular protrusion 114 and a through bore 16. End cap 112 is contained within the piston 89 as shown. O-ring 118 and washer 120 are interposed against the forward end of the spring 82 within the cap 112.

The housing block 85 includes an axial passageway 128. A recessed peripheral ledge 122 circumscribes a forward end of the passageway 128 and a through bore 124 extends into and through the housing ledge 122. A slide pin 126 projects through the bore 124 of housing 85, the bore 116 of cap 112, and into the housing 89 as shown. Piston 89 is thus slideably coupled to the block 85 and moves reciprocally in an axial direction relative thereto as described above.

A transverse bore 130 extends through housing 85 from side to side in communication with passageway 128. Mounting flanges 132, 134 extend laterally from the housing 85 and mounting screws 134 project through the flanges and into housing 88 to secure housing 85 to housing 88. The cord cutting assembly 98 includes a tubular member 136 rotatably residing within the transverse bore 130 and projecting from opposite sides of the housing 85. An attachment lug 138 projects outward from an end of the tubular member 136 and carries an inward facing attachment stud 139. The tubular member 136 has locking flanges 140 at an opposite end and a centrally disposed axial through bore 142. A transverse bore 144 having a funnel shaped guide entry 145 is positioned to extend through the tubular member 136.

A connector block 146 is attached to an end of the tubular member 136 and includes a locking socket 148 engaging the locking flanges 140 of member 136. An attachment stud 150 extends inwardly from the block 146. Piston 89 is configured having a cylindrical rearwardly disposed socket 152 stepping inward to a forward smaller diametered cylindrical portion 154. Outwardly projecting pin members 156 extending from opposite sides of the cylindrical portion 154 of the piston 89. As will be appreciated, forward ends 158 of pivot arms 102, 104 fixedly attach to the pins 156 and rearward ends of the arm 102, 104 fixedly attach through the studs 150, 139, respectively, to flanges 146, 138 of the tubular component 136.

Tubular member 136 resides within the transverse bore 130 of the block 85 and rotates freely therein. The ends of member 136 are journalled to the piston 89 through lever arms 102, 104. The funnel shaped entry 145 is positioned facing axially rearward of assembly 34. The cord 32 is dispensed and routed downward through entry 145 of member 136 and exits from the transverse bore 144 along the longitudinal center axis of the end of arm tooling assembly 34. As described previously, spring 82 is in a pre-loaded, state of compression between housing 85 and piston 89 while the cord 32 is applied in a predesigned pattern to the annular outer core surface 43. At the completion of the cord laying sequence or at required interim points in the application process, the cord 32 may be severed through the operation of shear assembly 98. An axial movement of the piston is initiated by a reduction of air pressure at intake 94. Spring 82 thereupon is uncoils and influences the piston 89 axially away from the housing 85. As the piston 89 moves away from the housing 85, the lever arms 102, 104 pull against the ends of the tubular member 136 and impart rotation thereto within housing block 85. As the member 136 rotates, edges defining the funnel shaped entry 145 are rotated into severing engagement against the cord 32 extending through the member 136. The cord 32 is thereby severed. The free end of cord 32, subsequent to the severing procedure, is generally in an axial alignment with the tooling assembly 34.

To re-route the cord 32 down the assembly 34 in order to resume laying cord, air pressure is re-applied through intake 94 and piston 97 is forced into the higher, retracted position of FIG. 13A, whereupon recompressing spring 82. Movement of the piston 89 into the retracted position causes the lever arms 102, 104 to rotatably return the tubular member 136 into its normal orientation within block 85. So oriented, the shearing edges defining funnel entry 145 of member 136 are in a non-contacting relationship to cord 32 and funnel entry 145 and transverse bore 144 are axially aligned with the center axis of tooling assembly 34. The severed end of cord 32 is thereafter re-routed down the axis of tooling assembly 34 to exit from the gap 78 between rollers 72, 74. To assist in the re-routing of the free end of cord 32, pressurized air is introduced through intake 92 and the forced air pushes the free end of the cord 32 along its axial path. The time required to re-position the end of the cord 32 at the outlet 78 is thereby reduced and cycle time minimized. The free severed end of cord 32 upon exiting between rollers 74, 76 is thus positioned for application to the core surface as a smooth linear feed of the cord 32 through the end of arm tooling is resumed.

Figure 16:
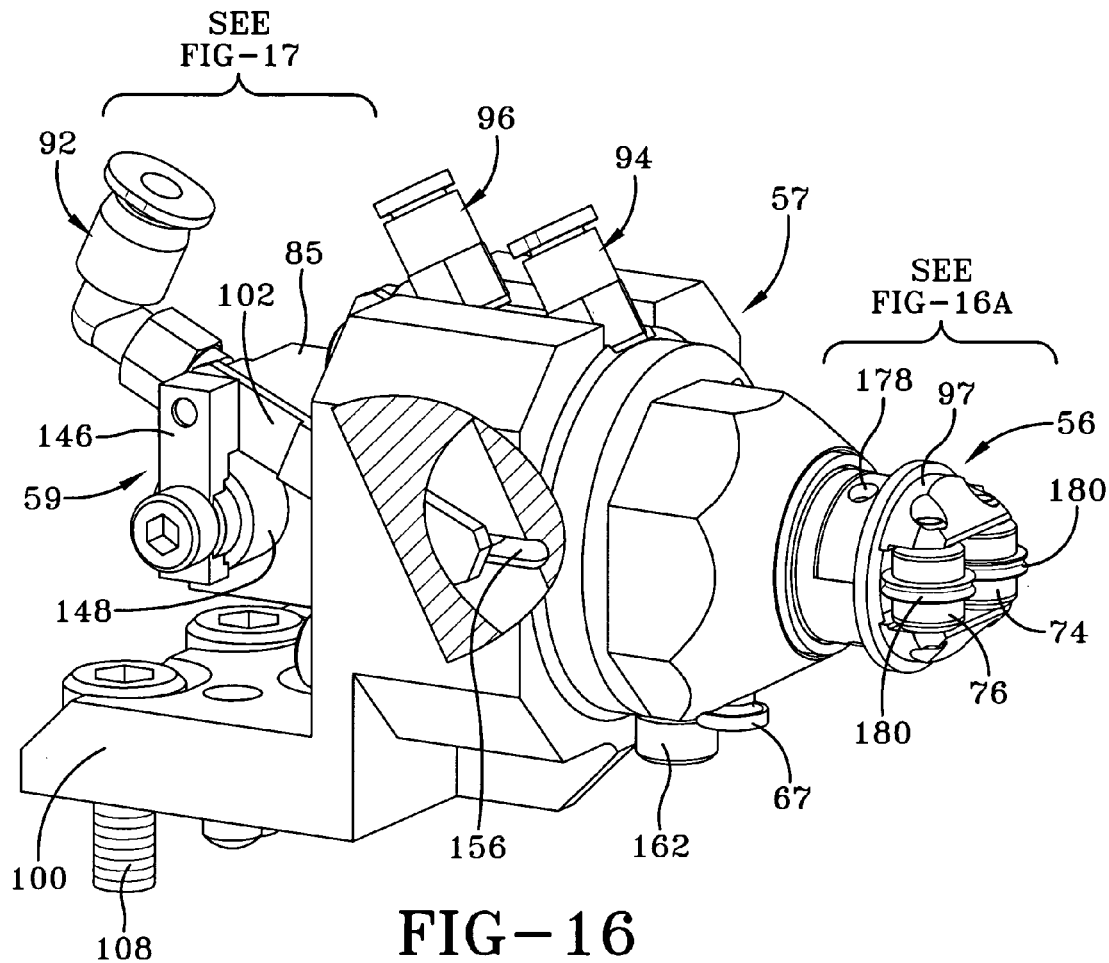
FIG. 16 is a front right perspective view of the ply laying end of arm tooling with portions sectioned for clarity.

Rollers 74, 76 are shown in FIG. 16 A as rotationally mounted to respective axial center shafts 166, 168. Shafts 166, 168 mount between a flange extension 170 of the nose block 97 and a retainer 172. So disposed, the rollers 74, 76 are axially parallel and spaced apart a distance sufficient to allow the cord 32 to pass therebetween. The retainer 172 includes adjacent sockets 174, 176 that receive upper ends of the shafts 166, 168 therein. An assembly aperture 178 projects through a rearward surface 182 of retainer 172 as shown. Each of the rollers 74, 76 is configured to provide a circumferential channel 180 having a sectional profile and dimension complimentary with the sectional configuration of cord 32. The nose block 97 receives the cord guide tube 80 therethrough with a forward end of tube 80 disposed adjacent the gap 78 between rollers 74, 76.

Assembly of the end of arm tooling 34 will be readily apparent from FIGS. 13A, B; 16, and 17. The nose block 97 is fixedly coupled to the housing 88 by the pin 67. The motor shaft 54 rotates reciprocally and causes the end of arm tooling to resultantly reciprocally rotate through an angular travel of plus or minus three to eight degrees. A greater or lesser range of pivotal movement may be used if desired. Pivotal movement of commensurate angular travel of in-line rollers 72, 74 is thus effected as best seen from FIG. 9. Each roller 72, 74 are alternatively brought into and out of engagement against the core surface 43 through the pivotal movement of assembly 34. The pressure applied by each roller 72, 74 against the surface 43 are controlled through application of appropriate air pressure through the intake portal 94.

Figure 3C:
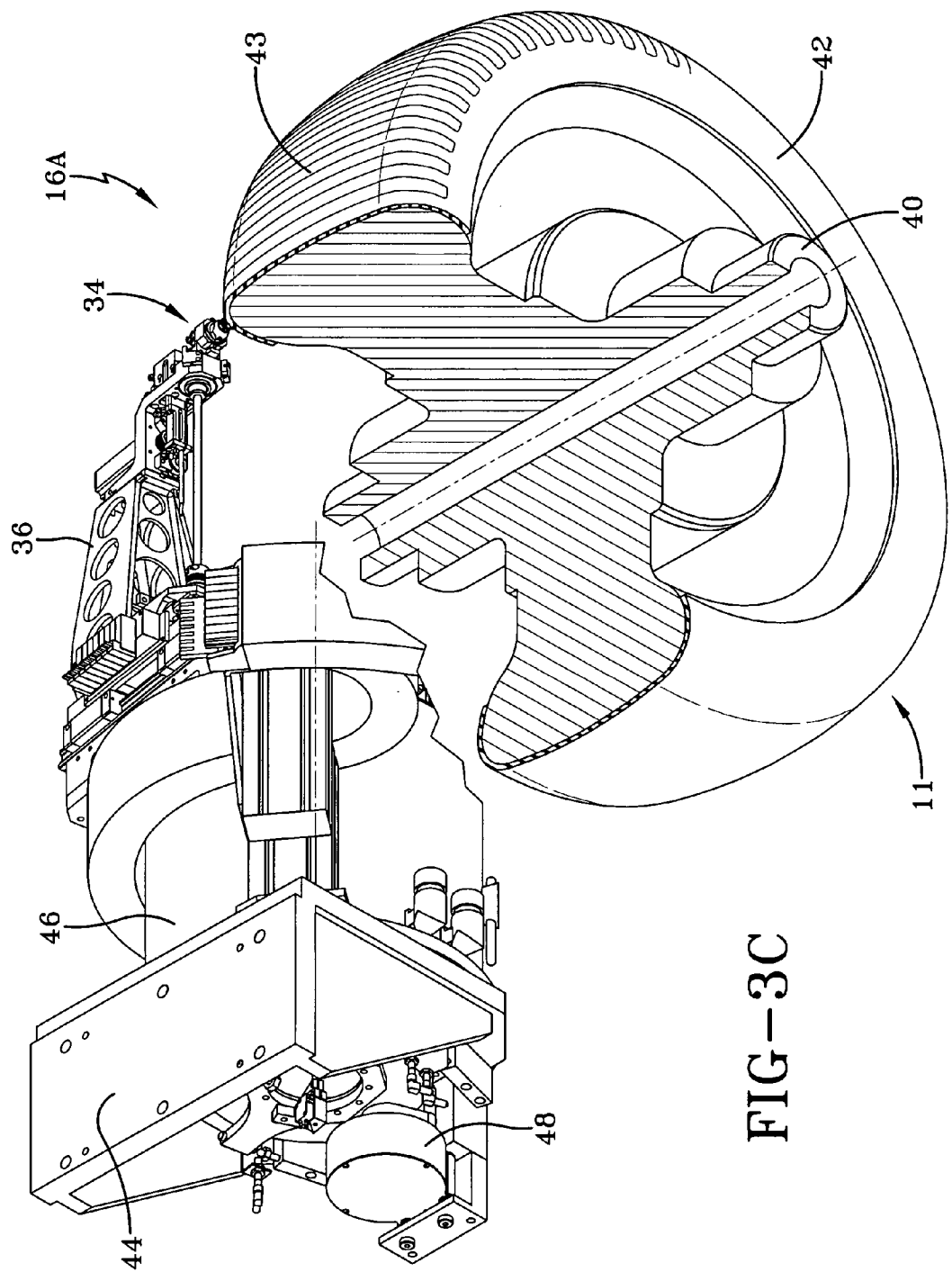
FIG. 3C is an enlarged perspective view of the ply laying assembly shown in FIG. 3A at a subsequent terminal position relative to the tire build core.
Figure 4:
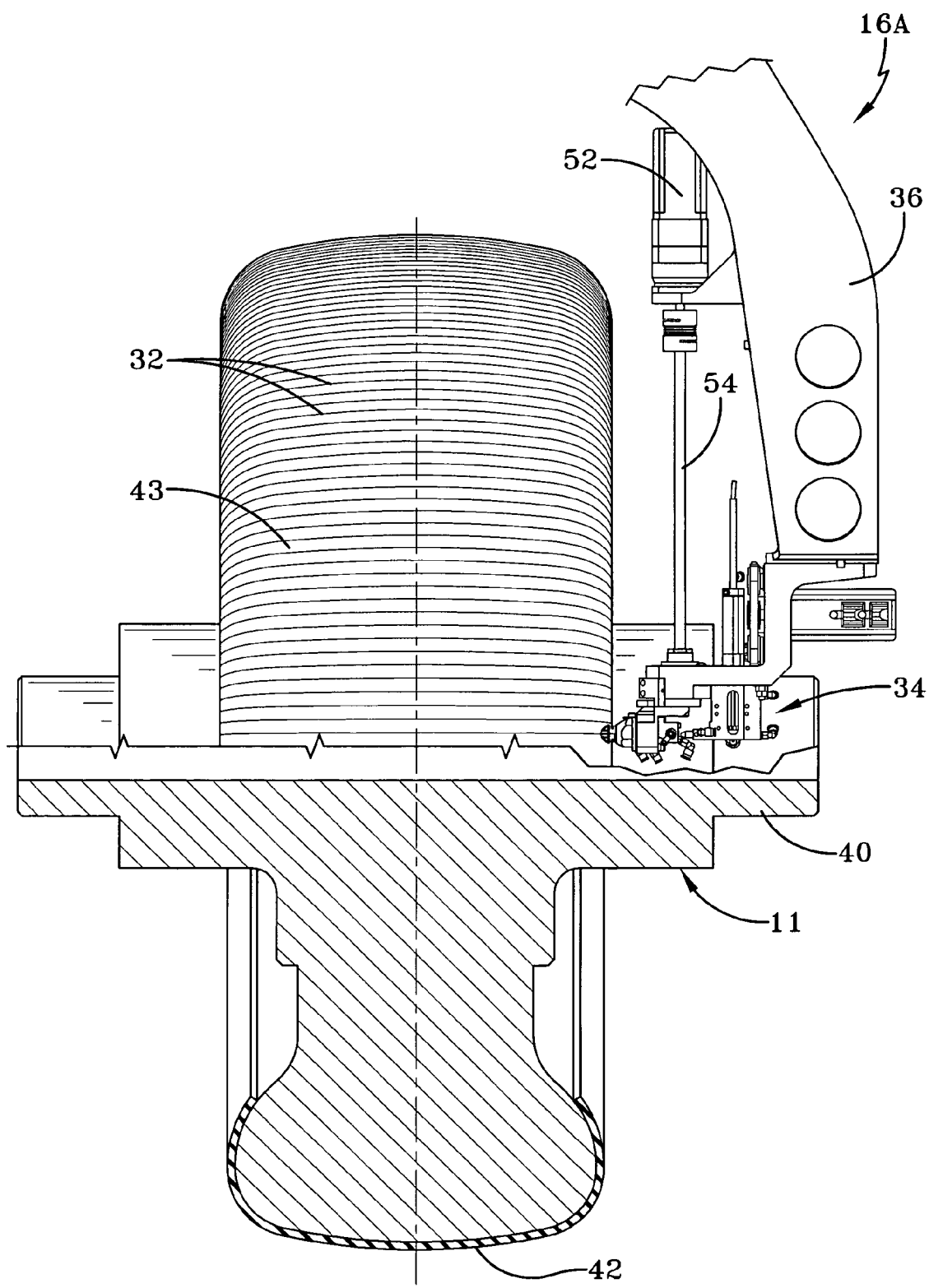
FIG. 4 is a front elevation view shown in partial transverse section for illustration of a ply laying apparatus configured pursuant to the invention at the terminal position relative to the tire build core.

As seen from FIGS. 3A-C; 5; and 7, end of arm tooling 34 mounts to the C-frame arm 36 and are carried thereby toward and away from the surface 43 of core 42. The C-frame arm 36 is slideably mounted to the Z-axis slide 50 and reciprocally moves end of arm tooling 34 laterally across the surface 43 in a predefined pattern. Adjustment in the Z axis along slide 50 is computer controlled to coordinate with the other axis of adjustment of end of arm tooling 34 to allow for the application of cord to cores of varying sizes. The cord 32 is dispensed from cord let-off spool 28, through a conventional balancer mechanism 34 and to the arm assembly. The end of cord 32 is routed at the end of arm cord tensioning assembly 58 (FIGS. 9 and 10) and then into the axial passageway through end of arm tooling assembly 34. Upon entering assembly 34, the cord 32 passes through the tubular member 136 of the cable shear assembly 98 and then proceeds along the axial guide passage 80 to the cord outlet 78 between rollers 74, 76. The cord is received within a circumferentially located roller channel 180 in each roller 74, 76, the roller receiving the cord being dependent upon the intended direction of travel of the cord across surface 43 pursuant to the predefined pattern. Appropriate pressure of the cord 32 by either roller 74 or 76 against a pre-applied carcass layer on core 42 causes the cord to adhere to the carcass layer at its intended location, thus forming the designed cord layer pattern.

Referring to FIGS. 12, 13B, 14, and 15, the alternative tilting operation of the end of arm tooling in regard to rollers 74, 76 will be explained. The rollers 74, 76 tilt along an angular path represented by angle θ (FIGS. 14 and 15) relative to the centerline of the end of arm tooling. Alternatively one or the other roller is in a dependent position relative to the other roller as a result of the pivotal movement of assembly 34. In a forward traverse of the tooling assembly across a carcass layer mounted to the core surface 43, one of the rollers will engage the cord 32 within roller channel 180 and stitch the cord 32 against the layer. For a reverse traverse of the tooling head across the carcass layer, the assembly 34 is tilted in a reverse direction to disengage the first roller from the cord 32 and place the second roller into an engaging relationship with cord 32. The second roller then effects a stitching of the cord 32 against the carcass layer mounted to core 42 in a reverse traverse.

Figure 5:
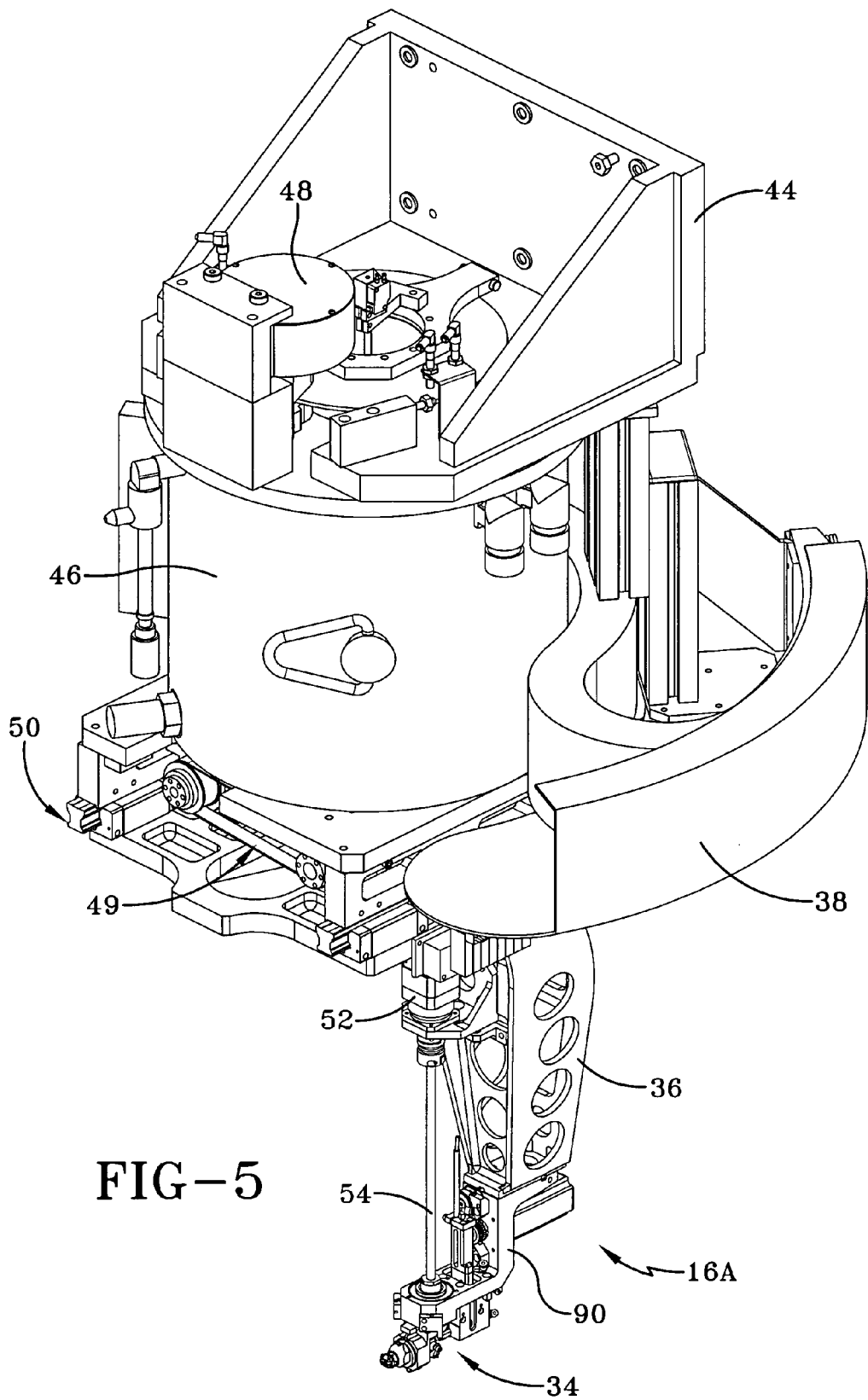
FIG. 5 is an enlarged perspective view of ply laying assembly.

The reciprocal pivotal movement of the end of arm tooling 34 is carefully coordinated with rotational indexing of the core 42 and lateral movement of the tooling assembly 34. Referring to FIGS. 5 and 6, it will be appreciated that the subject assembly 34 in combination with the core drive constitutes a system having three axis of rotation. A first axis is represented by a pivoting of assembly 34 through an angular tile by the drive shaft 54. Shaft 54 is preferably driven by a computer controlled servo-motor 52. A second axis of rotation is the lateral rotation of the assembly 34 driven by motor 46. Motor 46 is preferably, but not necessarily a computer controlled ring motor that, responsive to computer generated control signals, can accurately index the assembly 34 along a rotational path following the outer surface 43 of the core 42. A third axis of rotation is the indexing of the core spindle 42 by motor 14 (FIG. 1). Motor 14 is preferably, but not necessarily a ring motor that, responsive to computer generated control signals, can accurately index the core 42 in coordination with the ring motor 46 rotationally driving the assembly 34.

The arm assembly 16A, carrying end of arm tooling 34, is further adjustable along a linear path representing a z-axis as shown in FIGS. 5, 6, and 7. The arm assembly 16A travels along the slide 50 controlled by a timing belt drive 49. Movement of the assembly 16A along slide 50 is computer controlled to correlate with the size of the core on which the cord is applied. One or more computers (not shown) are employed to coordinate rotation of core 42 (by ring motor 14); rotation of end of arm tooling assembly 34 (by ring motor 46); linear path adjustment of assembly 16A along the Z-axis (by timing belt drive of assembly 16A along slide 49); and tilting adjustment of assembly 34 (by servo-motor 52). The assembly thus precisely controls the movement of assembly 16A in three axis of rotation and along a linear path (slide 50) to enable tooling assembly 34 to accurately place cord 32 in an intended pattern on a surface 43 of a core 42 of varying size without need for specialized equipment to form a loop in the cord at the end of each traverse. Creation of the loop at the conclusion of each traverse is accomplished by an indexed controlled rotation of the core 42. Thus, the cord laying assembly functions to form the loop without the need for a finger mechanism to engage, press, and release the cord. The pattern of cord applied to the carcass layer upon core 42 may thus be tailored to provide optimum performance while conserving cord material, resulting in reduced cost of manufacture.

As will be appreciated, a reciprocal pivoting movement of the end of arm tooling head that alternately places one of the rollers 74, 76 into engagement with cord 32 while disengaging the opposite roller results in several significant advantages. First, in disengaging one of the rollers from the carcass layer, the frictional drag of the disengaged roller is eliminated. As a result, the associated drive motor that drives the end of arm tooling may operate with greater speed and efficiency. Additionally, redundant and unnecessary engagement of the disengaged roller from the cord 32 with the underlying elastomeric layer and the cord is eliminated, reducing the potential for damage to both the cord 32 and the underlying carcass layer. Moreover, in utilizing dual rollers mounted in-line, the speed of cord application is at which the cord 32 is applied to the carcass may be improved and the drive mechanism simplified.

It will be appreciated that the application head portion of the tooling 34 is air spring biased against the surface 43 of core 42 during the application of cord 32 through pressurized intake 94. The air spring created by intake 94 compresses coil spring 82 and therethrough exerts a substantially constant force through nose housing 97 to rollers 74, 76. The biasing force upon rollers 74, 76 is applied to cord 32 as described above, and serves to pressure the cord 32 against a carcass layer previously applied to the core surface 43. The tackiness of the pre-applied layer retains the cord 32 at its intended placement. A more secure placement of the cord 32 results, and the potential for any unwanted, inadvertent post-application movement of the cord 32 from the underlying carcass layer is minimized. At the appropriate time for severing the cord 32 by means of the shearing assembly 98, separation of housings 89 and 85 is effected as shown in FIG. 15B, 16, 12-D as described previously.

As described previously, to reposition the severed end of the cord 32 for another application cycle, pressurized air is introduced through intake portal 92 and pneumatically forces the free cord end down the axial passageway 80 to the cord outlet 78 between rollers 74, 76. Application of the cord to the carcass layer on the core 42 may then recommence.

With reference to FIGS. 1, 1A, and 2, it will further be appreciated that a plurality of like-configured arm assemblies 16A-D may, if desired at the option of the user, be deployed at respective circumferential locations about the core 42 in operable proximity to the core surface 43. Each of the plurality of arm assemblies is assigned a specific region of the annular core surface 43. The plural arm assemblies may then simultaneously apply a cord layer pursuant to the above recitation to its respective assigned region. In segmenting the cord annular surface 43 between multiple arm assemblies and simultaneously applying the cord by means of the arm assemblies, a faster cycle time results. While four arm assemblies 16A-D are shown, more or fewer arm assemblies may be deployed if desired.

Referring to FIGS. 18A-D, 19-27. to advance the cords 32 on a specified path 190, the end of arm tooling mechanism 34 which contains the two rollers 74, 76 forms the cord outlet 78 which enables the cord path 190 to be maintained in this center. As illustrated, the cords 32 are held in place by a combination of embedding the cord into an elastomeric compound 192 previously placed onto the toroidal surface 43 and the surface tackiness of the uncured compound. Once the cords 32 are properly applied around the entire circumference of the toroidal surface 43 a subsequent lamination of elastomeric topcoat compound (not shown) can be used to complete the construction of the ply 194. It will be appreciated that more than one cord layer may be applied to the core 42, if desired or required. Additional elastomeric layers may be added to the core and additional cord layers applied as described above. Optionally, if desired, the top or bottom coat of elastomeric material may be eliminated and the cord applied in successive layers to form multiple plies on the core 42.

Figure 14:
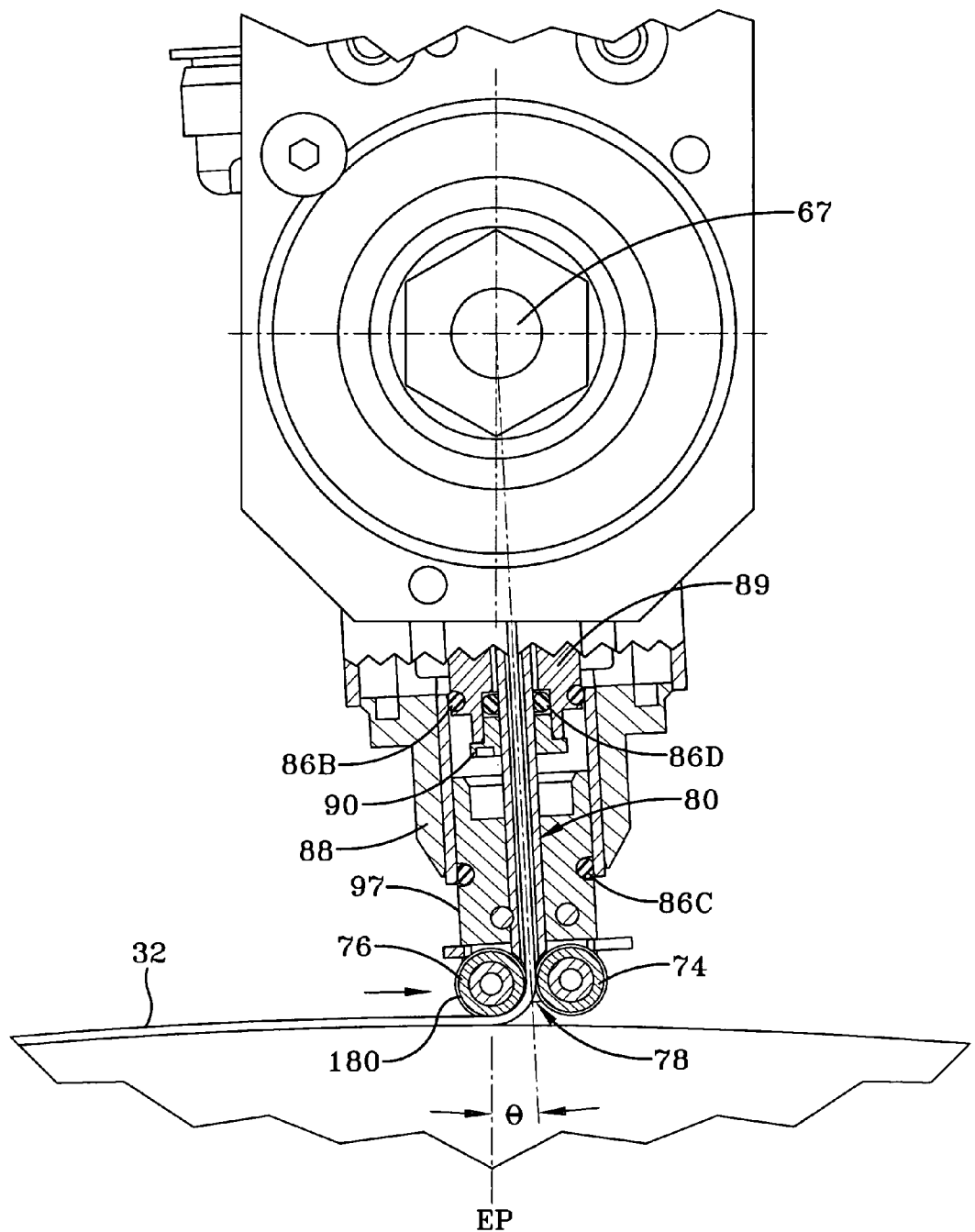
FIG. 14 is a transverse section view through the ply laying end of arm tooling of FIG. 13A shown moving in a tilted forward direction.
Figure 15:
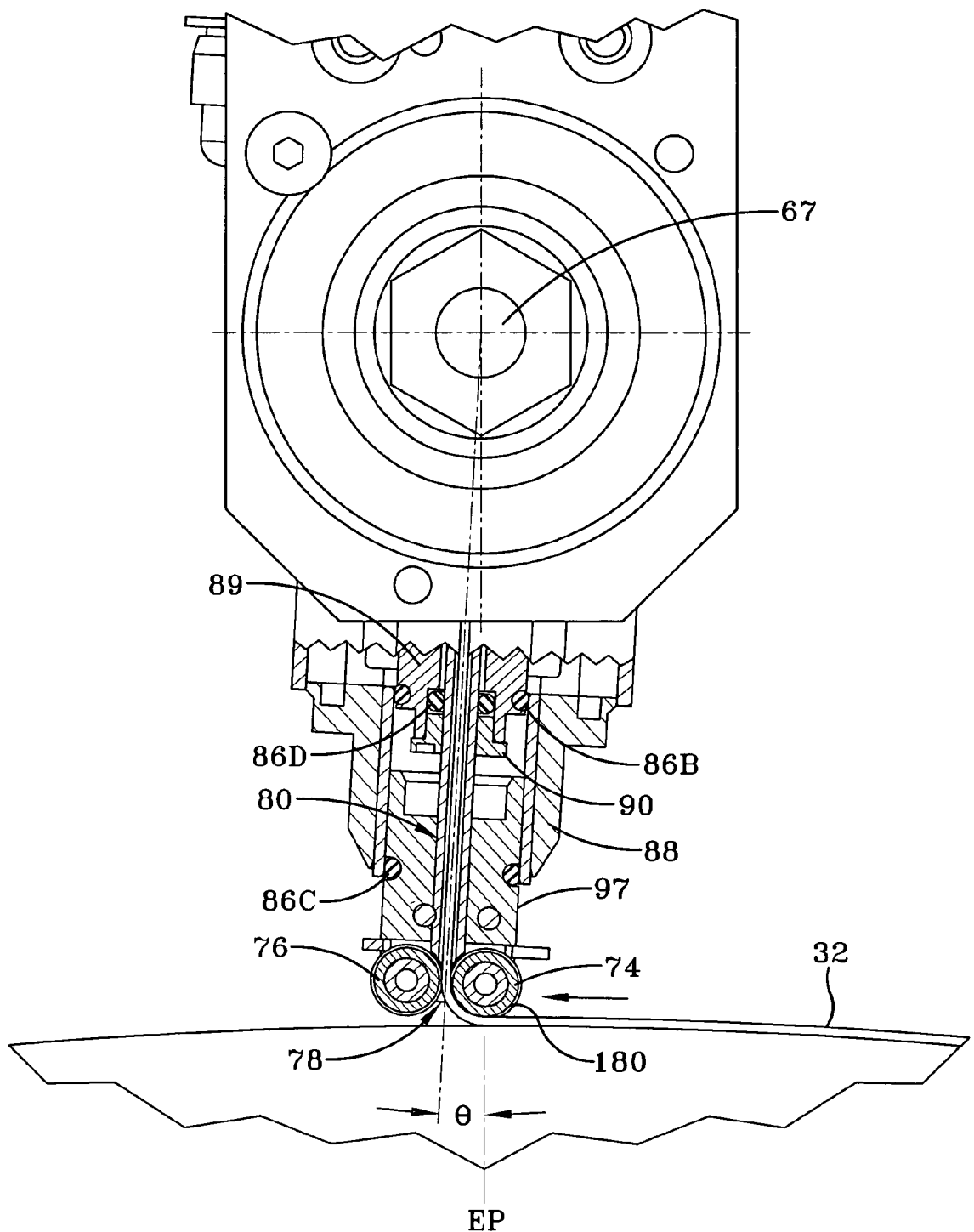
FIG. 15 is a transverse section view through the ply laying end of arm tooling of FIG. 13A shown moving in a reverse tilted reverse direction.

As illustrated and explained previously, the first roller 76 will embed the cord 32 on a forward traverse across the toroidal surface 43 as illustrated in FIG. 14. Once the cord path 190 has been transferred across the toroidal surface 43 the mechanism 34 stops and the cord 32 is advanced along the toroidal surface 43 by rotation of the core 42. The mechanism 34 then reverses its path 190 forming a loop 196 in the ply cord path 190. At this point a tilting of the end of arm tooling head block 97 causes the first roller 76 of the pair to disengage and the second roller 74 to engage the cord 32 to pull the cord 32 back across the toroidal surface 43. In the preferred embodiment the toroidal surface 43 is indexed or advanced slightly allowing a circumferential spacing or pitch (P) to occur between the first ply pathway down in the second return ply path. The loop 196 that is formed on the reverse traverse is slightly shifted to create the desired loop position. A looped end 196 may be formed and the second ply path 190 may be laid on the toroidal surface 43 parallel to the first ply path, or other geometric paths may be created by selective variation in the core indexing (rotation) coupled with the speed at which the end of arm tooling head traverses the core surface 43 in the forward and/or reverse directions.

The process is repeated to form a series of cords 32 that are continuous and which have the intended preselected optimal pattern. For example, without intent to limit the patterns achievable from the practice of the invention, the toroidal core 42 with the toroidal surface 43 with an elastomeric compound 192 laminated onto it may be indexed or advanced uniformly about its axis with each traverse of the pair of rollers 74, 76 to create a linearly parallel path 190 uniformly distributed about the toroidal surface 43. By varying the advance of the cord 32 as the mechanism 34 traverses, it is possible to create non-linear parallel cord paths 190 to tune tire stiffness and to vary flexure with the load.

Figure 10:
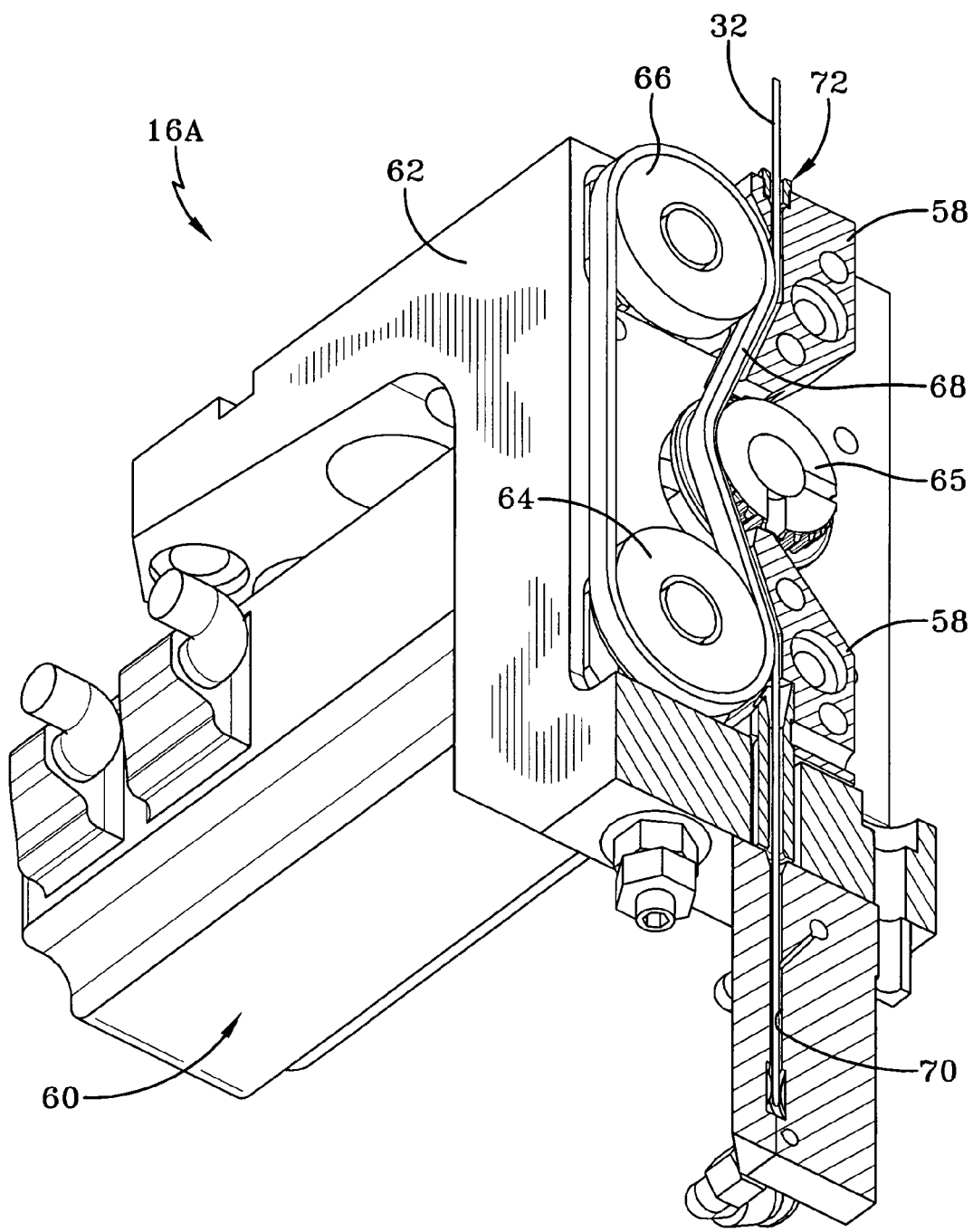
FIG. 10 is an enlarged perspective view of the cord tensioning and feed assembly.

Preferably the cord 32 is wrapped around the tensioner assembly 58 to adjust and maintain the required tension in the cord 32 (FIG. 10). The pulley 65 is laterally adjustable to alter the tension in the belt 68 which, in turn engages the cord 32 passing beneath pulleys 64, 66 and over pulley 65. More or less tension in the belt 68 translates into more or less tension in the cord 32. If the cord 32 is too tight it will lift the cord from the coat laminate when the rollers 74, 76 reverse direction. If it is too loose it will not create a loop at the correct length. Moreover, the amount of tension applied has to be sufficiently small that it does not lift the cords 32 from their placed position on the toroidal surface 43. The cord 32 under proper tension will rest on the toroidal surface 43 positioned and stitched to an elastomeric layer 192 such that the tack between the cord 32 and the elastomeric layer 192 is larger than the tension applied by the tensioner assembly 58. This permits the cords 32 to lay freely onto the toroidal surface 43 without moving or separating during the ply construction period.

Figures 18A, 18B:
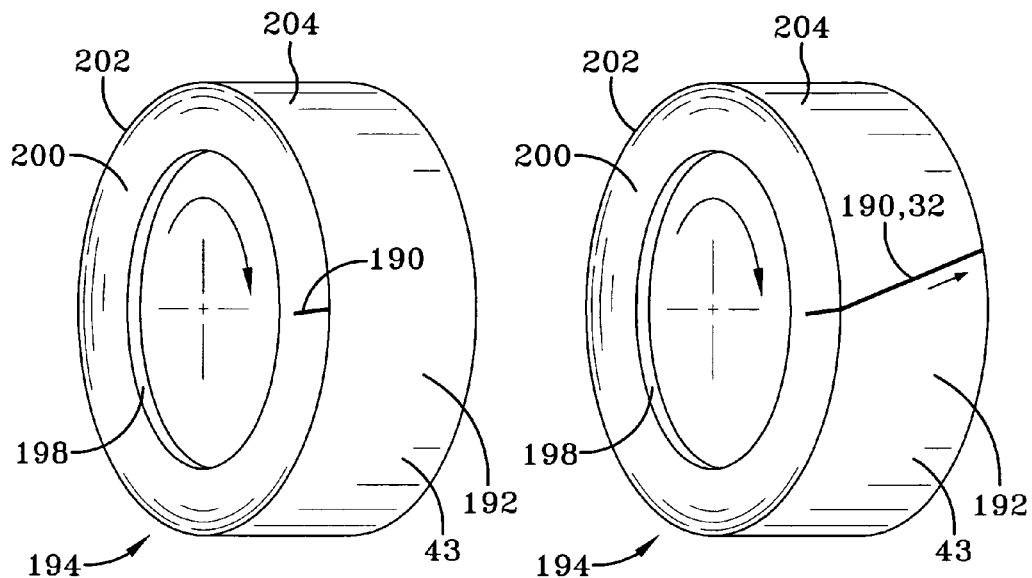
FIGS. 18A-D are sequential views of the tire forming mandrel showing the build of a ply layer by means of single cord application pursuant to the invention.

With reference to FIGS. 18A-D, depicted is a three dimensional view of a cylinder representing how the ply path 190 is initiated along what would generally be considered the bead region 198 of the carcass 194 along the tire sidewall 200 toward the shoulder region 202 of the toroidal surface 43 and then traverses across the toroidal surface 43 in an area commonly referred to as the crown 204 as illustrated in FIG. 18B.

Figures 18C, 18D:
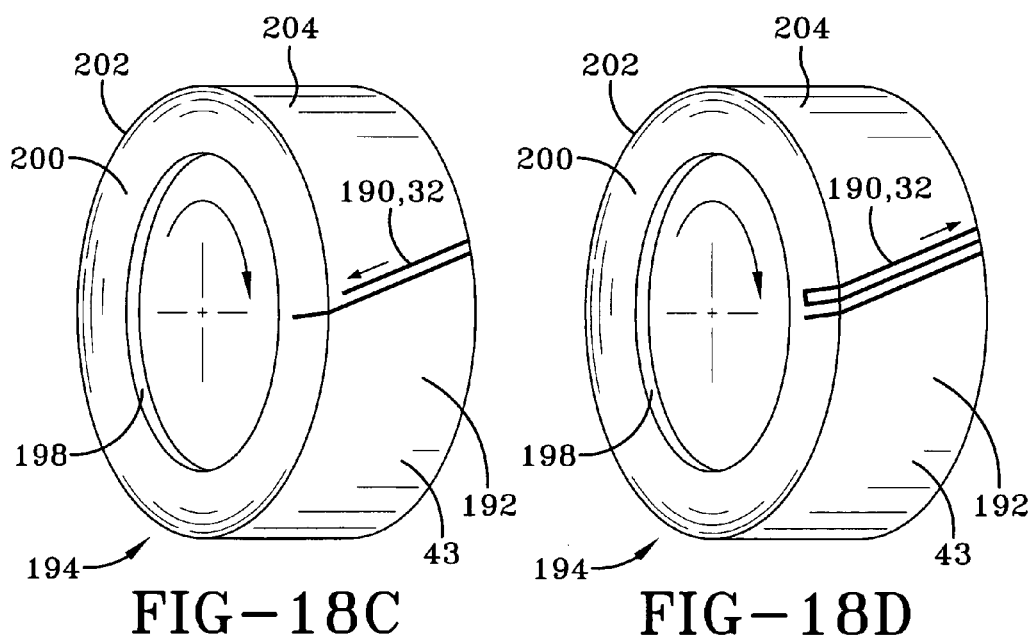
Figure 19:
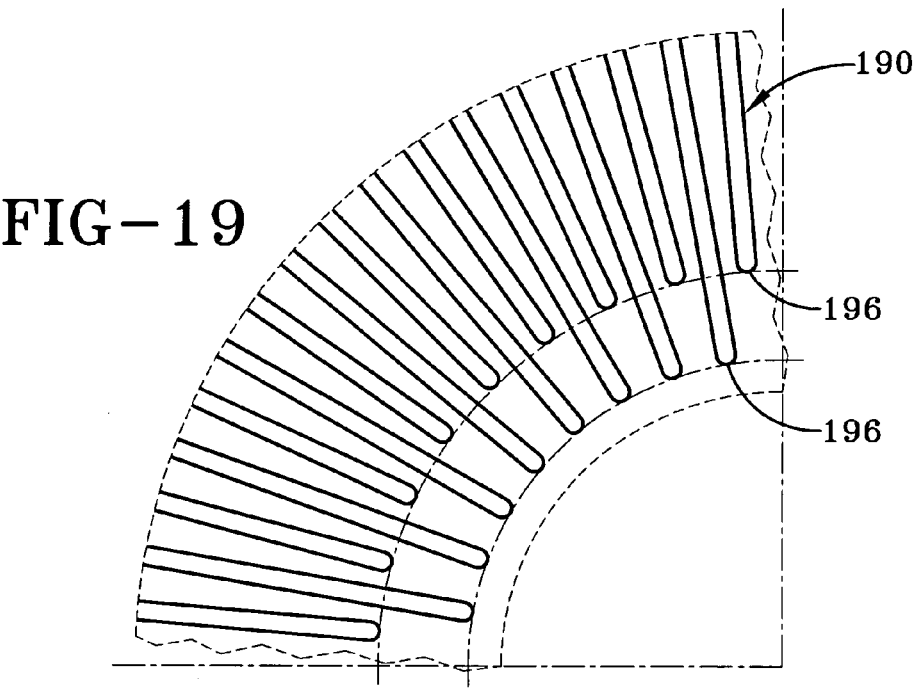
Figure 20:
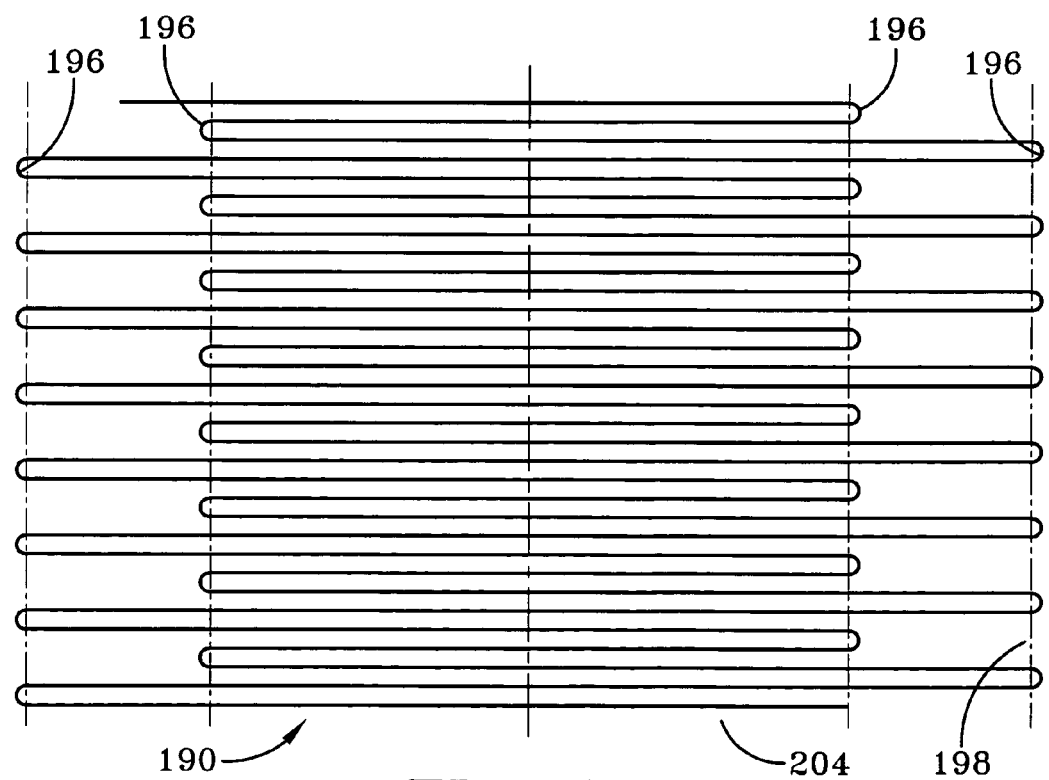
Figure 24:
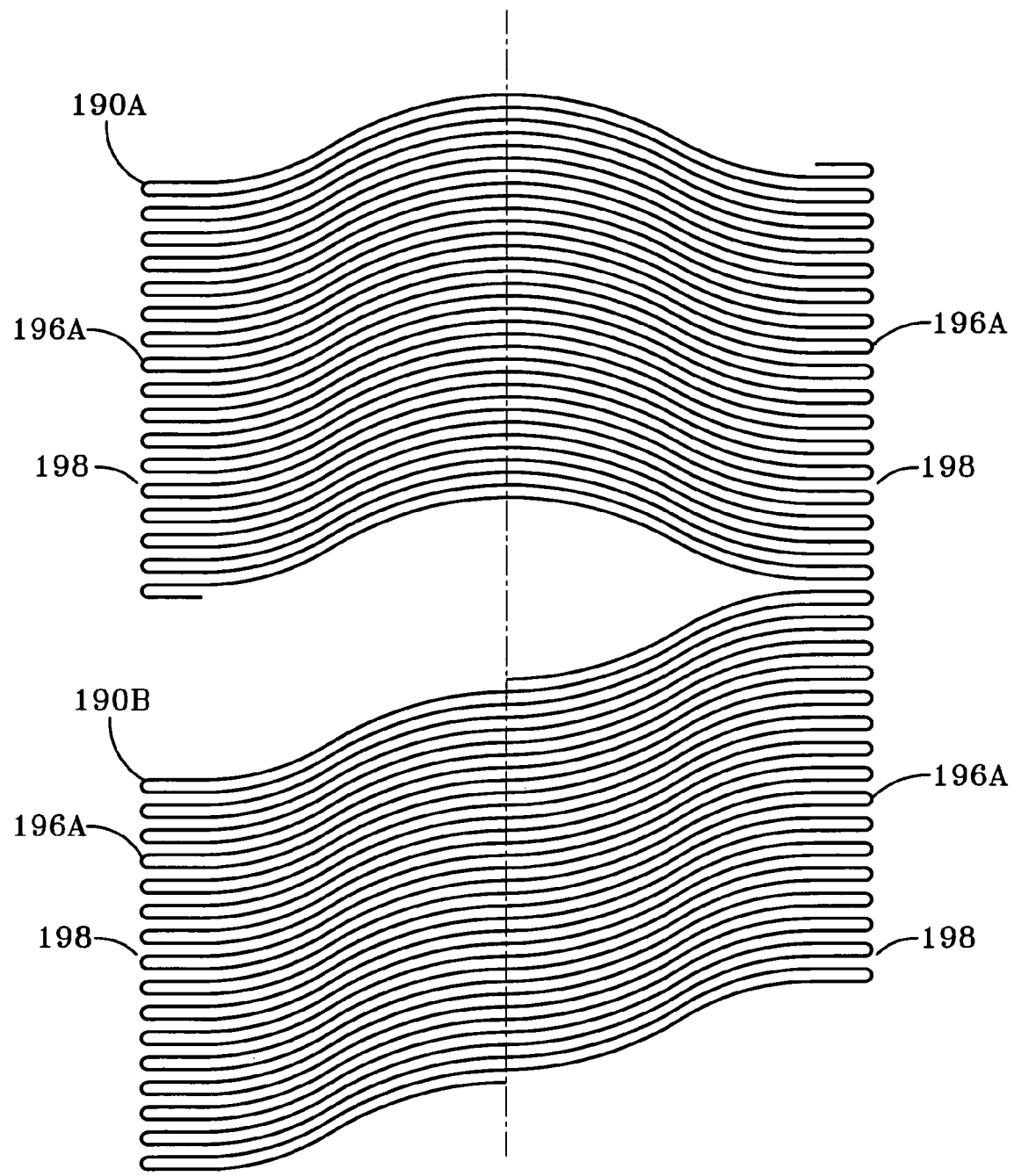
Figure 28:
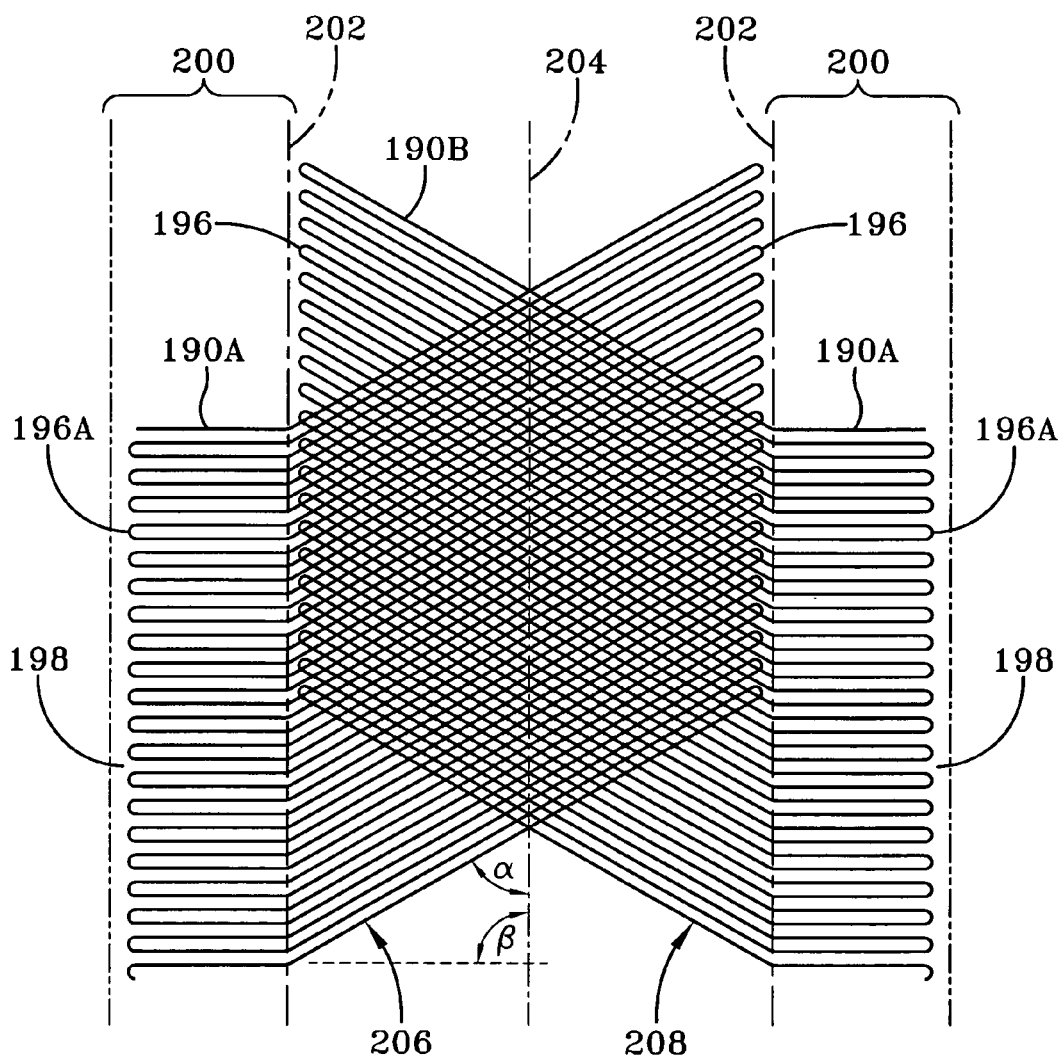

In FIG. 18B it will be noticed that the ply cord path 190 is laid at a slight angle. While the ply path 190 may be at any angle including radially at 90° or less, the ply path 190 also can be applied in a non-linear fashion. As shown in FIG. 18C, once the ply cord 32 is traversed completely across the toroidal surface 43 and down the opposite side the loop 196 is formed as previously discussed and the cord 32 is brought back across the crown 204 as shown in FIG. 18C. In FIG. 18D the cord 32 then proceeds down the tire sidewall 200 towards the bead region 198 where it is turned forming a loop 196 as previously discussed and then traverses back across the toroidal surface 43 in a linear path 190 as illustrated that is parallel to the first and second ply cord paths 190. This process is repeated in FIGS. 19 and 20 as the toroidal surface 43 is indexed, creating a very uniform and evenly spaced ply cord path 190.

Other cord patterns may be devised and implemented using the end of arm tooling 34 of the present invention. The speed at which core 42 is rotated and or the speed of the traverse travel of the tooling head 56 across surface 43 may be varied in order to generate patterns of preferred configuration. By way of example, cord laying patterns are depicted in FIGS. 19-27 showing sample cord pattern configurations. The present invention is not intended to be limited to those patterns depicted and other patterns obvious to those skilled in the art may be devised.

Figure 16A:
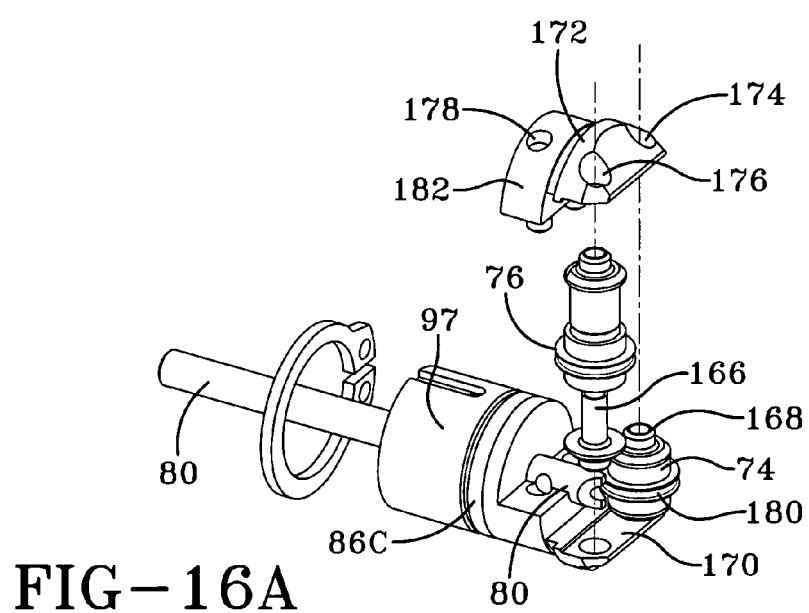
FIG. 16A is a partially exploded perspective view of the roller assembly of the ply laying end of arm tooling.
Figure 16B:
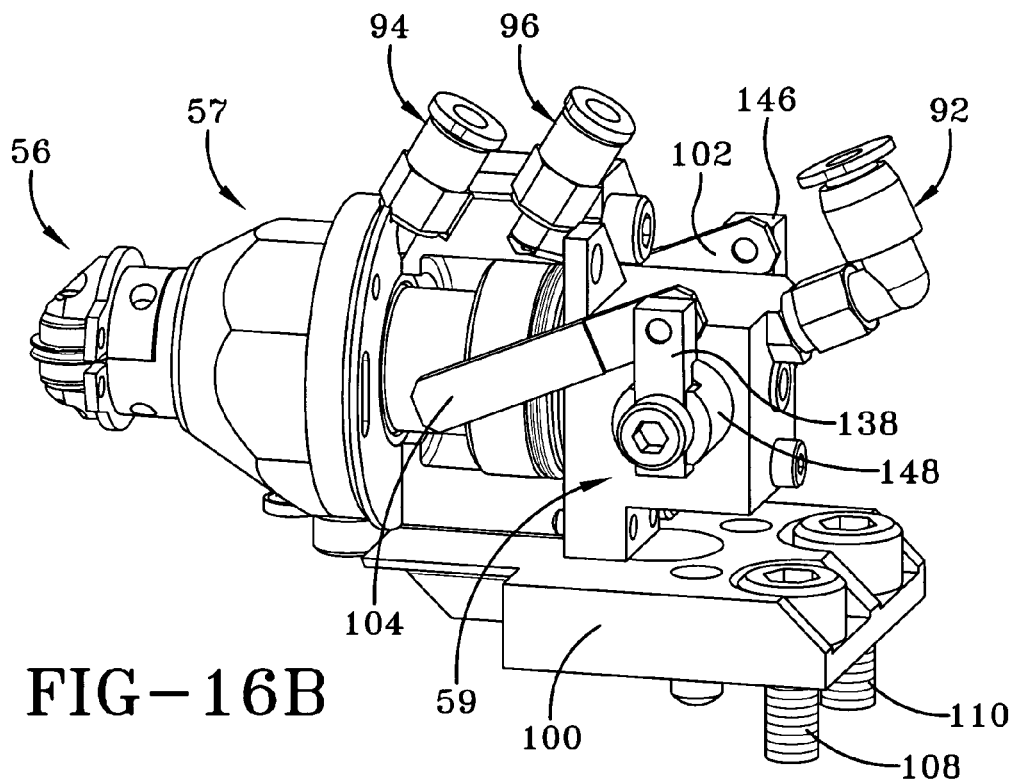
FIG. 16B is a left side perspective view of the end of arm tooling without the outer housing shown for the purpose of illustrating the position of the shear piston and linkage in the extended position.
Figure 16C:
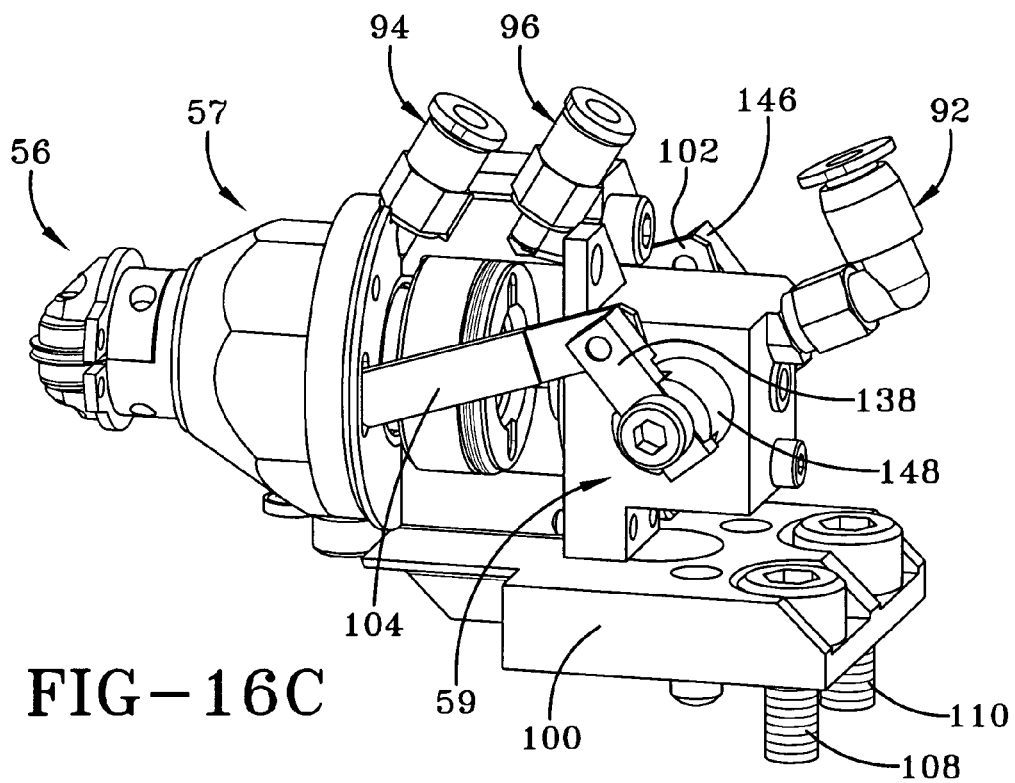
FIG. 16C is a left side perspective view of the end of arm tooling without the outer housing shown for the purpose of illustrating the position of the shear piston and linkage in the retracted position.
Figure 17:
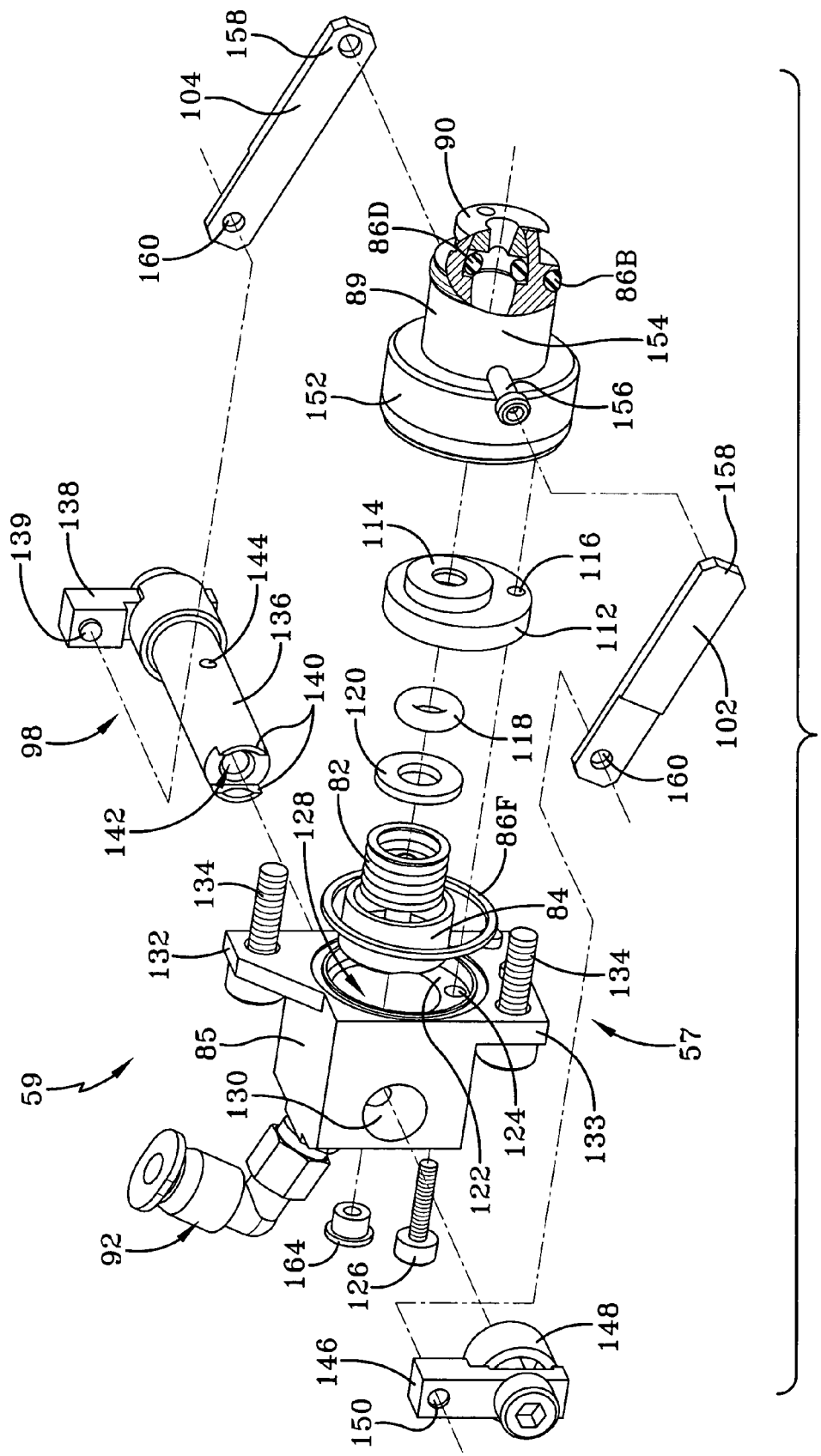
FIG. 17 is an exploded perspective view of the cord cutting subassembly of the ply laying end of arm tooling.

With reference to FIG. 13 and 16A, it will be noted that the nose block 97 is slidably attached to the tooling head housing 88 by means of set pin 67. The nose block 97 reciprocally moves in an axial direction as indicated in phantom in FIG. 13A. The plunger or piston 89 resides within an internal chamber of the housing 88 and moves axially in reciprocal fashion to activate the cord cutting mechanism 96 as described above. The axial movement of the plunger 89 is independent of the movement of nose block 97. That is, axial movement of plunger 89 may be effected to actuate the cutting assembly mechanism without displacing the relative position of the nose block 97 to annular core surface 43.

The intake portal 94 communicates with the internal chamber of the housing 88 and introduces pressurized air into the chamber to create an air spring. The pressurized air within the chamber applies a substantially constant optimal pressure against the nose block 97. The applied air pressure against the nose block thus biases the rollers 74, 76 against the annular core surface 43 and rollers 74, 76 pressure the cord 32 against the surface 43 with an optimal pressure.

The end of arm tooling head 34 thus maintains a constant optimal pressure against the annular surface and a proper placement of the cord onto the underlying layer results. Imperfections in the previously applied layers create surface anomalies that make the application of the cord at a constant pressure problematic. By applying a constant air pressure to the nose block 97 through intake 94, surface anomalies do not interfere with an accurate placement of the cord 32 with the optimal level of roller pressure.

Moreover, it will be noted that the end of arm tooling head 34 is relatively simple in construction and is therefore less expensive to manufacture and maintain when compared against tooling heads that incorporate mechanical fingers and paddles to loop and pressure the cord into the ply compound as the head traverses the core surface. The pneumatic spring created by intake 94 allows the tooling head to maintain a constant pressure against the annular core surface in a highly controlled manner. Contact between the rollers 72, 74 and the surface 43 may thereby be maintained throughout the creation of a complete cord layer and the air spring created by intake 94 compensates for any surface anomalies in the immediately underlying layer or in layers previously applied to the core.

From the foregoing, the invention achieves a tooling head for bi-directional tire cord application to an annular surface that couples a nose block assembly (such as block 97 and rollers 72, 74) a tooling head assembly (such as housing 88). The nose block assembly moves reciprocally in an axial direction relative to the tooling head housing and includes a cord engaging element (such as rollers 72, 74) mounted to a remote end. The cord engaging element moves with the nose block assembly in a forward and a reverse direction across the annular surface and is positioned to engage at least one cord 32 against the annular surface 43 in the forward and reverse directions. In accordance with the invention, a biasing element (intake 94) is provided to engage against the nose block assembly and bias the cord engaging element against the annular surface in the forward and reverse directions.

The cord engaging element may be represented by a plurality of rollers 72, 74, at least one roller of the plurality of rollers engaging against the annular surface in the forward direction and disengaging from the annular surface 43 in the reverse direction. A tilt mechanism for tilting the nose block assembly (shaft 54) between first and second angular positions may further be utilized while the cord engaging means moves respectively in the forward and reverse directions across the annular surface.

The tooling head assembly includes a chamber and the biasing element comprises a pneumatic intake 94 in communication with the tooling head assembly chamber for directing pressurized air into housing 88 and against the nose block assembly. Contact between the nose block assembly and the annular core surface 43 is thus maintained constant at an optimal pressure until the cord layer is completed by the tooling head traversing the annular surface in the forward and reverse directions.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tooling head for bi-directional tire cord application to an annular surface, the head comprising:
    a tooling head housing;
    a nose block assembly coupled to the tooling head housing to operatively move reciprocally along an axis of the tooling head housing;
    a cord engaging element coupled to the nose block assembly and operatively moveable in a forward and a reverse direction across the annular surface, the cord engaging element positioning at least one cord against the annular surface in the forward and reverse directions; and
    a biasing element engaging against the nose block assembly for biasing the cord engaging element against the annular surface in the forward and reverse directions, wherein the biasing element comprises a spring in combination with a pneumatic intake in communication with a tooling head assembly chamber, the pneumatic intake operative to direct pressurized air against the nose block assembly to compress the spring; and
    a cord cutting mechanism coupled to the nose block assembly and operative to cut the cord by movement of the nose block assembly upon reduction of the air pressure at the pneumatic intake and expansion of the spring.

2. A tooling head according to claim 1 wherein the nose block assembly is located on the tooling head to operatively station closely adjacent the annular surface.

3. A tooling head according to claim 1, wherein the cord engaging element is located at a remote end of the nose block assembly operatively positioned for engagement against the annular surface.

4. A tooling head according to claim 1 wherein the cord engaging element comprises a plurality of rollers, at least one roller of the plurality of rollers operative to engage against the annular surface in the forward direction and tilt to disengage from the annular surface in the reverse direction.

5. A tooling head according to claim 1, wherein the nose block assembly at least partially resides within a tooling head assembly chamber and the biasing element pneumatic intake is in pneumatic communication with the tooling head assembly chamber for directing pressurized air against the nose block assembly.

6. A tooling head according to claim 1 further comprising an angular tilt mechanism for operatively tilting the nose block assembly between annular surface engaging and annular surface disengaging first and second angular positions while the cord engaging element moves respectively in the forward and reverse directions across the annular surface.

7. A tooling head according to claim 6, wherein the cord engaging element comprises a plurality of rollers, at least a first roller of the plurality of rollers operative to engage against the annular surface in the forward direction and disengage from the annular surface in the reverse direction responsive to pivotal movement of the tilt mechanism between the first and second angular positions.

8. A tooling head according to claim 1 wherein the biasing element directs a biasing force against the nose block assembly substantially along a center axis of the tooling head.

9. A tooling head assembly for bi-directional tire cord application to an annular surface, the head comprising:
    a tooling head housing operative to move in a forward and a reverse direction of travel across the annular surface;
    a nose block assembly coupled to the tooling head housing to operatively move along an axis of the tooling head housing;
    a roller coupled to the nose block assembly operative to position at least one cord against the annular surface in the forward and reverse directions;
    a tilt mechanism coupled to the housing operative to angularly tilt the roller into an alternative annular surface engaged forward orientation and an annular surface disengaged rearward orientation in the forward and reverse directions of tooling head travel, respectively;
    a biasing element engaging against the nose block assembly and operatively configured to bias the roller against the annular surface in the forward direction of tooling head travel, wherein the biasing element comprises a spring in combination with a pneumatic intake in communication with a tooling head assembly chamber, the pneumatic intake operative to direct pressurized air against the nose block assembly to compress the spring; and
    a cord cutting mechanism coupled to the nose block assembly and operative to cut the cord by movement of the nose block assembly upon reduction of the air pressure at the pneumatic intake and expansion of the spring.

10. A tooling head according to claim 9, further comprising a plurality of rollers, at least one roller of the plurality of rollers operative to engage against the annular surface in the forward direction of tooling head travel and operative to disengage from the annular surface in the reverse direction of tooling head travel.

11. A tooling head according to claim 9, further comprising a plurality of rollers, at least a first roller of the plurality of rollers operative to engage against the annular surface in the forward direction of tooling head travel and disengage from the annular surface in the reverse direction of tooling head travel responsive to pivotal movement of the rollers between the forward and reverse directions of tooling head travel.

12. A tooling head according to claim 9 wherein a plurality of rollers are mounted to a terminal end of the nose block assembly in an axially parallel relationship and define a cord exiting passageway therebetween.

* * * * *